(12) United States Patent
Grubert

(10) Patent No.: US 8,802,016 B2
(45) Date of Patent: Aug. 12, 2014

(54) ZONED CATALYZED SOOT FILTER

(75) Inventor: Gerd Grubert, Hannover (DE)

(73) Assignee: BASF Catalyst Germany GmbH, Nienburg/Weser (DE)

( * ) Notice: Subject to any disclaimer, the term of this patent is extended or adjusted under 35 U.S.C. 154(b) by 130 days.

(21) Appl. No.: 12/951,868

(22) Filed: Nov. 22, 2010

(65) Prior Publication Data

US 2011/0123421 A1 May 26, 2011

(30) Foreign Application Priority Data

Nov. 20, 2009 (EP) ..................................... 09176583

(51) Int. Cl.
*B01D 50/00* (2006.01)
*B28B 1/00* (2006.01)

(52) U.S. Cl.
USPC ........................................... 422/177; 264/629

(58) Field of Classification Search
USPC ................................................. 422/177, 180
See application file for complete search history.

(56) References Cited

U.S. PATENT DOCUMENTS

| | | | |
|---|---|---|---|
| 4,727,052 A | 2/1988 | Wan et al. | |
| 4,961,917 A | 10/1990 | Byrne | |
| 5,516,497 A | 5/1996 | Speronello et al. | |
| 2005/0129601 A1* | 6/2005 | Li et al. | 423/239.2 |
| 2008/0141661 A1 | 6/2008 | Voss et al. | |
| 2009/0084266 A1 | 4/2009 | Yamada et al. | |
| 2009/0137386 A1 | 5/2009 | Pfeifer et al. | |

FOREIGN PATENT DOCUMENTS

| | | |
|---|---|---|
| DE | 102004040549 | 2/2006 |
| DE | 102005005663 | 8/2006 |
| EP | 0 984 142 A1 | 3/2000 |
| EP | 1 398 069 A2 | 3/2004 |
| EP | 1 486 248 A1 | 12/2004 |
| EP | 1 870 573 A1 | 12/2007 |
| EP | 2044999 | 4/2009 |
| EP | 2106841 | 10/2009 |
| JP | 2009/068347 | 4/2009 |
| WO | WO 01/12320 A1 | 2/2001 |
| WO | WO-2004/079167 | 9/2004 |
| WO | WO 2006/031600 A1 | 3/2006 |
| WO | WO 2007/077462 A1 | 7/2007 |

OTHER PUBLICATIONS

PCT IPRP in PCT/EP2010/067914, mailed Mar. 8, 2012, 17 pgs.
"PCT International Search Report for PCT/EP2010/067914", Mar. 9, 2011, 4.

* cited by examiner

*Primary Examiner* — Tom Duong
(74) *Attorney, Agent, or Firm* — Servilla Whitney LLC

(57) ABSTRACT

The present invention relates to a catalyzed soot filter which comprises a wall flow substrate with an inlet end, an outlet end, a substrate axial length extending between the inlet end and the outlet end, and a plurality of passages defined by internal walls of the wall flow substrate wherein the plurality of passages comprise inlet passages having an open inlet end and a closed outlet end, and outlet passages having a closed inlet end and an open outlet end, and wherein the internal walls of the inlet passages comprise a zoned first inlet coating, the internal walls of the outlet passages comprise a zoned first outlet coating, and wherein the first inlet coating and the first outlet coating are present on the wall flow substrate at a coating loading ratio of less than 0.5.

32 Claims, 5 Drawing Sheets

ZONED CATALYZED SOOT FILTER

TECHNICAL FIELD

The present invention relates to a zoned catalyzed soot filter. This soot filter comprises a wall flow substrate which comprises an inlet end, an outlet end, a substrate axial length extending between the inlet end and the outlet end, and a plurality of passages defined by internal walls of the wall flow substrate. The plurality of said passages comprise inlet passages having an open inlet end and a closed outlet end, and outlet passages having a closed inlet end and an open outlet end. The internal walls of the inlet passages comprise a first inlet coating that extends from the inlet end to a first inlet coating end, thereby defining a first inlet coating length, wherein the first inlet coating length is x % of the substrate axial length with 0<x<100. The internal walls of the outlet passages comprise a first outlet coating that extends from the outlet end to a first outlet coating end, thereby defining a first outlet coating length, wherein the first outlet coating length is 100-x % of the substrate axial length. The first inlet coating length thereby defines an upstream zone, and the first outlet coating length defines a down-stream zone. According to a preferred embodiment, both the first inlet coating and the first outlet coating comprise an oxidation catalyst. According to the present invention, the first inlet coating and the first outlet coating are present on the wall flow substrate at a specific coating loading ratio defined as the inlet coating loading relative to the outlet coating loading. In particular, said coating loading ratio is less than 0.5.

BACKGROUND

Operation of lean burn engines such as diesel engines provide the user with excellent fuel economy and have very low emissions of gas phase hydrocarbons and carbon monoxide due to their operation at high air/fuel ratios under fuel lean conditions. Diesel engines also offer significant advantages over gasoline engines in terms of their fuel economy, durability, and their ability to generate high torque at low speed. However, there are certain materials contained in diesel engine exhaust gas which are known to cause pollution and therefore may have severe influence on the environment. Apart from gaseous emissions such as carbon monoxide ("CO"), unburned hydrocarbon ("HC") and nitrogen oxides ("NOx"), diesel engine exhaust also contains condensed phase materials, i.e. liquids and solids, which constitute the so-called particulate matter ("PM"). The total particulate matter emissions comprised in diesel exhaust comprises, apart from the soluble organic fraction ("SOF") and the so-called the sulfate fraction, the solid and dry carbonaceous fraction which is also known as "soot" fraction. This soot contributes to the visible soot emissions commonly associated with diesel exhaust. The soluble organic fraction can exist in diesel exhaust either as vapour or as an aerosol, i.e. fine droplets of liquid condensate, depending on the temperature of the diesel exhaust. Generally, it is present as condensed liquid at the standard particulate collection temperature of 52° C. in diluted exhaust, as prescribed by a standard measurement test such as the U.S. Heavy Duty Transient Federal Test Procedure. These liquids are believed to arise from two sources: one the one hand, lubricated oil swept from cylinder walls of the engine each time the pistons go up and down, and on the hand, unburned or only partially burned diesel fuel. The sulfate fraction is believed to be formed from small quantities of sulfur components present in the diesel fuel.

Catalyzed filters are typically provided in diesel engine exhaust systems to achieve high particulate matter reduction, in particular soot reduction, and to convert certain or all of the exhaust components to innocuous components. Known filter structures that remove particulate matter from diesel exhaust include honeycomb wall flow filters, wound or packed fiber filters, open cell foams, sintered metal filters, etc. However, ceramic wall flow filters, described below, receive the most attention. Typical ceramic wall flow filter substrates are composed of refractory materials such as cordierite or silicon-carbide. Wall flow substrates are particularly useful to filter particulate matter from diesel engine exhaust gases. A common construction is a multi-passage honeycomb structure having the ends of alternate passages on the inlet and outlet sides of the honeycomb structure plugged. This construction results in a checkerboard-type pattern on either end. Passages plugged on the inlet axial end are open on the outlet axial end. This permits the exhaust gas with the entrained particulate matter to enter the open inlet passages, flow through the porous internal walls and exit through the channels having open outlet axial ends. The particulate matter is thereby filtered on the internal walls of the substrate. The gas pressure forces the exhaust gas through the porous structural walls into the channels closed at the upstream axial end and open at the downstream axial end. The accumulating particles will increase the back pressure from the filter on the engine. Thus, the accumulating particles have to be continuously or periodically burned out of the filter to maintain an acceptable back pressure. Catalyst compositions deposited along the internal walls of the wall flow substrate assist in the regeneration of the filter substrates by promoting the combustion of the accumulated particulate matter. The combustion of the accumulated particulate matter restores acceptable back pressures within the exhaust system. These processes may be either passive or active regeneration processes. Both processes utilize an oxidant such as $O_2$ or $NO_2$ to combust the particulate matter. Passive regeneration processes combust the particulate matter at temperatures within the normal operating range of the diesel exhaust system. Preferably, the oxidant used in the regeneration process is $NO_2$ since the soot fraction combusts at much lower temperatures than those needed when $O_2$ serves as the oxidant. While $O_2$ is readily available from the atmosphere, $NO_2$ can be actively generated though the use of upstream oxidation catalysts which oxidize NO in the exhaust stream.

In spite of the presence of the catalyst compositions and provisions for using $NO_2$ as the oxidant, active regeneration processes are generally needed to clear out the accumulated particulate matter, and restore acceptable back pressures within the filter. The soot fraction of the particulate matter generally requires temperatures in excess of 500° C. to burn under oxygen rich, i.e. lean conditions, which are higher temperatures than those typically present in diesel exhaust. Active regeneration processes are normally initiated by altering the engine management to raise temperatures in front of the filter up to 570-630° C. Depending on driving mode, high exotherms can occur inside the filter when the cooling during regeneration is not sufficient, such as at low speed/low load or in idle driving mode. Such exotherms may exceed 800° C. or more within the filter. In coated wall flow filters, exposure to such high temperatures during regeneration events shortens the useful lifetime of the catalyst compositions coated along the length of the substrate. Moreover, different segments along the axial length of the substrate are disproportionately affected by the regeneration process. Deposition of the particulate matter is not homogeneous along the length of the wall flow filter, with higher proportions of the particulate matter accumulating in the downstream segment of the filter. Consequently, the temperatures are not homogeneously distributed over the length of the substrate but show a maximum temperature in the downstream segment during active regeneration events. Thus, the durability of the catalyst composition along the downstream segment limits the useful lifetime of the entire catalyst-coated wall flow substrate.

High material costs associated with certain oxidation catalysts such as, for example, platinum group metal-containing compositions augment the need to slow or prevent the degradation of catalyst coatings due to active regeneration events. Catalyst coatings disposed on wall flow filters often contain platinum group metal components as active catalyst components to ensure acceptable conversions of the gaseous emissions such as HC and/or CO of the diesel exhaust to innocuous components (e.g., $CO_2$, $H_2O$). The loadings of such components are generally adjusted so that the catalyst substrate meets emissions regulations even after catalyst aging.

Certain conventional coating designs for wall flow substrates have a homogeneous distribution of coating along the entire axial length of the internal walls. In such designs the oxidation catalyst concentration is typically adjusted to meet the emissions requirements under the most stringent conditions. Most often such conditions refer to the catalyst's performance after the catalyst has aged. The cost associated with the required platinum group metal concentration is often higher than is desired.

Other conventional coating designs for wall flow substrates employ concentration gradients of the platinum group metal components along the axial length of the substrate. In these designs certain catalyst zones, e.g., an upstream zone, have a higher concentration of platinum group metals than do adjacent axial zones such as, e.g., a down-stream zone. Typically, the internal walls of the axial zone where the higher concentration of platinum group metal components are disposed, will have a lower permeability than an adjacent zone having a lower concentration of platinum group metals due to a higher washcoat loading. An exhaust stream passing along the length of the inlet passage will travel through the internal wall in the segments that have the highest permeability. Thus, the gas stream will tend to flow through the internal wall segments that have lower concentration of oxidation catalyst. This differential flow pattern can result in inadequate pollutant conversion. For instance, certain gaseous pollutants, e.g., unburned hydrocarbons, require contact with higher concentrations of platinum group metal components than do particulate components to achieve sufficient levels of combustion. This requirement is exacerbated during operating conditions where the exhaust temperatures are cooler, e.g., at startup.

EP 1 870 573 A1 discloses a diesel particulate filter which comprises a plurality of cells which are partitioned by porous cell walls and are closed in a staggered manner by plugs at an upstream end of the filter and at an opposite downstream end thereof wherein an first oxidation catalyst coating layer is formed on the entire surface of the cell walls of the cells that are open at the upstream end of the filter, and a second oxidation catalyst coating layer is formed on the surfaces of the cell walls of the cells which are open at the downstream end of the filter, in a downstream part of the filter. Thus, this document discloses filters having a region of the cell walls dividing the cells which are open at the upstream end and the cells which are open at the downstream end wherein the catalyst coating layers of the respective cells overlap, due to the fact that the first oxidation catalyst coating layer is formed on the entire surface of the respective cell walls.

WO 01/12320 A1 discloses a wall-flow filter for an exhaust system of a combustion engine, which filter comprises a plurality of channels in honeycomb arrangement, wherein at least some of the channels are plugged at an upstream end and at least some of the channels not plugged at the upstream end are plugged at a downstream end; an oxidation catalyst on a substantially gas impermeable zone at an upstream end of the channels plugged at the downstream end; and a gas permeable filter zone downstream of the oxidation catalyst for trapping soot, characterized in that in an exhaust system the oxidation catalyst is capable of generating sufficient $NO_2$ from NO to combust the trapped soot continuously at a temperature less than 400° C. According to this document, the coatings on the opposite sides of a given cell wall are applied in such a way that there is a region of the cell wall which is free of coating on both sides in order to allow for a gas permeable zone.

EP 1 486 248 A1 discloses an integrated multi-functional catalyst system which comprises a diesel particulate filter having an inlet side for receiving flow and an opposite outlet side; a substrate in the diesel particulate filter having an interior wall surface and an exterior wall surface; a first washcoat layer applied to the interior wall surface and adjacent the inlet side; and a second washcoat layer applied to the exterior wall surface and adjacent the outlet side, wherein flow distribution through the substrate is dispersed for minimizing back pressure. According to a preferred embodiment, the first washcoat layer occupies a first length of the substrate, the second washcoat layer occupies a second length of the substrate, wherein the sum of the first length and the second length is approximately equal to a total length of the substrate. According to a still further preferred embodiment, EP 1 486 248 A1 discloses a diesel particulate filter having an inlet side for receiving flow and an opposite outlet side; a plurality of honeycomb cells within the diesel particulate filter, wherein alternating exit channels are blocked at the inlet side and alternating inlet channels are blocked at the opposite outlet side; a substrate for each of the inlet channels, each substrate having an interior wall surface and an exterior wall surface; a first washcoat layer applied to the interior wall surface and adjacent the inlet side; and a second washcoat layer, applied to the exterior wall surface and adjacent the outlet side, wherein flow distribution through the substrate is dispersed for minimizing back pressure. It is stated that this second washcoat layer contains a different function than the first washcoat layer.

WO 2006/031600 A1 discloses a zoned catalyzed soot filter having a wall flow substrate with an inlet end, an outlet end, a substrate axial length extending between the inlet end and the outlet end, and a plurality of passages defined by internal walls of the wall flow substrate. The plurality of passages has inlet passages with an open inlet end and a closed outlet end, and outlet passages with a closed inlet end and an open outlet end. The internal walls of the inlet passages have a first inlet coating that extends from the inlet end to a first inlet coating end, thereby defining a first inlet coating length. The first inlet coating length is less than the substrate axial length. The internal walls of the outlet passages have an outlet coating that extends from the outlet end to an outlet coating end, thereby defining an outlet coating length. The outlet coating length is less than the substrate axial length. The sum of the first inlet coating and outlet coating lengths is substantially equal to the substrate axial length. The first inlet coating length defines an upstream zone and the outlet coating length defines a downstream zone. The first inlet coating contains at least one first inlet platinum group metal component. At least 50% of the platinum group metal components are present in the upstream zone. According to the teaching of this document, the washcoat loading ratio, defined as the washcoat loading of the first inlet zone relative to the washcoat loading of the outlet coating, is in the range from 0.5 to 1.5. Thus, this document does not differentiate between embodiments wherein the washcoat loading ratio is greater than or smaller than 1. Further, a specific lower limit for the washcoat loading ratio is defined, namely a limit of 0.5.

Generally, when an active regeneration of a catalyzed soot filter used in a diesel exhaust system is stopped during its run, e.g. when the engine goes into idle run, very high temperatures occur in the rear end of the catalyzed soot filter by uncontrolled soot burning. It is believed that the temperature maximum in that rear part of the filter decreases with the soot loading in the rear part of the filter. The maximum soot loading on the filter, often referred to as soot mass limit ("SML") is determined by this maximum temperature. It was an object of the present invention to provide a catalyzed soot filter which allows for an increased soot mass loading ("SML") and thus for a decreased maximum temperature.

Therefore, the present invention is directed to a catalyzed soot filter which has a coating design which allows for a low maximum temperature during drop to idle regeneration and a high soot mass limit.

SUMMARY

Provided is a catalyzed soot filter, comprising
a wall flow substrate comprising an inlet end, an outlet end, a substrate axial length extending between the inlet end and the outlet end, and a plurality of passages defined by internal walls of the wall flow substrate;
wherein the plurality of passages comprise inlet passages having an open inlet end and a closed outlet end, and outlet passages having a closed inlet end and an open outlet end;
wherein the internal walls of the inlet passages comprise a first inlet coating that extends from the inlet end to a first inlet coating end, thereby defining a first inlet coating length, wherein the first inlet coating length is x % of the substrate axial length with 0<x<100;
wherein the internal walls of the outlet passages comprise a first outlet coating that extends from the outlet end to a first outlet coating end, thereby defining a first outlet coating length, wherein the first outlet coating length is 100-x % of the substrate axial length;
wherein the first inlet coating length defines an upstream zone and the first outlet coating length defines a downstream zone;
wherein the first inlet coating and the first outlet coating are present on the wall flow substrate at a coating loading ratio of less than 0.5, calculated as ratio of the loading of the first inlet coating (g/inch$^3$ (g/(2.54 cm)$^3$)): loading of the second inlet coating (g/inch$^3$ (g/(2.54 cm)$^3$)).

Preferably, provided is a catalyzed soot filter, comprising
a wall flow substrate comprising an inlet end, an outlet end, a substrate axial length extending between the inlet end and the outlet end, and a plurality of passages defined by internal walls of the wall flow substrate;
wherein the plurality of passages comprise inlet passages having an open inlet end and a closed outlet end, and outlet passages having a closed inlet end and an open outlet end;
wherein the internal walls of the inlet passages comprise a first inlet coating that extends from the inlet end to a first inlet coating end, thereby defining a first inlet coating length, wherein the first inlet coating length is x % of the substrate axial length with 0<x<100, said first inlet coating containing an oxidation catalyst;
wherein the internal walls of the outlet passages comprise a first outlet coating that extends from the outlet end to a first outlet coating end, thereby defining a first outlet coating length, wherein the first outlet coating length is 100-x % of the substrate axial length, said first outlet coating containing an oxidation catalyst;
wherein the first inlet coating length defines an upstream zone and the first outlet coating length defines a downstream zone;
wherein the first inlet coating and the first outlet coating are present on the wall flow substrate at a coating loading ratio of less than 0.5, calculated as ratio of the loading of the first inlet coating (g/inch$^3$ (g/(2.54 cm)$^3$)): loading of the second inlet coating (g/inch$^3$ (g/(2.54 cm)$^3$)).

Further provided is a process for manufacturing such catalyzed soot filter, comprising
(i) providing a wall flow substrate, preferably having a porosity in the range of from 38 to 75, determined according to mercury porosity measurement according to DIN 66133, said wall flow substrate comprising an inlet end, an outlet end, a substrate axial length extending between the inlet end and the outlet end, and a plurality of passages defined by internal walls of the wall flow substrate;
wherein the plurality of passages comprise inlet passages having an open inlet end and a closed outlet end, and outlet passages having a closed inlet end and an open outlet end;
(ii) applying the first inlet coating to the internal walls of the inlet passages such that the first inlet coating extends from the inlet end to the first inlet coating end whereby a first inlet coating length is defined, wherein the first inlet coating length is x % of the substrate axial length with 0<x<100, thereby adjusting the loading of the first inlet coating to a predetermined value which is preferably in the range of from 0.1 to 1 g/inch$^3$ (g/(2.54 cm)$^3$);
(iii) before (ii) or simultaneously with (ii) or after (ii), applying the first outlet coating to the internal walls of the outlet passages such that the first outlet coating extends from the outlet end to the first outlet coating end whereby a first outlet coating length is defined, wherein the first outlet coating length is 100-x % of the substrate axial length, thereby adjusting the loading of the first outlet coating to a value so that the coating loading ratio, calculated as ratio of the loading of the first inlet coating (g/inch$^3$ (g/(2.54 cm)$^3$)): loading of the first outlet coating (g/inch$^3$ (g/(2.54 cm)$^3$)) is less than 0.5, preferably in the range of from 0.10 to 0.45, more preferably from 0.20 to 0.40, more preferably from 0.30 to 0.35.

Preferably, further provided is a process for manufacturing such catalyzed soot filter, comprising
(i) providing a wall flow substrate, preferably having a porosity in the range of from 38 to 75, determined according to mercury porosity measurement according to DIN 66133, said wall flow substrate comprising an inlet end, an outlet end, a substrate axial length extending between the inlet end and the outlet end, and a plurality of passages defined by internal walls of the wall flow substrate;
wherein the plurality of passages comprise inlet passages having an open inlet end and a closed outlet end, and outlet passages having a closed inlet end and an open outlet end;
(ii) applying the first inlet coating to the internal walls of the inlet passages such that the first inlet coating extends from the inlet end to the first inlet coating end whereby a first inlet coating length is defined, wherein the first inlet coating length is x % of the substrate axial length with 0<x<100, said first inlet coating containing an oxidation catalyst, thereby adjusting the loading of the first inlet coating to a predetermined value which is preferably in the range of from 0.1 to 1 g/inch$^3$ (g/(2.54 cm)$^3$);

(iii) before (ii) or simultaneously with (ii) or after (ii), applying the first outlet coating to the internal walls of the outlet passages such that the first outlet coating extends from the outlet end to the first outlet coating end whereby a first outlet coating length is defined, wherein the first outlet coating length is 100-x % of the substrate axial length, said first outlet coating containing an oxidation catalyst, thereby adjusting the loading of the first outlet coating to a value so that the coating loading ratio, calculated as ratio of the loading of the first inlet coating (g/inch$^3$ (g/(2.54 cm)$^3$)): loading of the first outlet coating (g/inch$^3$ (g/(2.54 cm)$^3$)) is less than 0.5, preferably in the range of from 0.10 to 0.45, more preferably from 0.20 to 0.40, more preferably from 0.30 to 0.35.

Also provided is a system for treating a diesel engine exhaust gas stream, the system comprising an exhaust conduit in fluid communication with the diesel engine via an exhaust manifold; such catalyzed soot filter; and one or more of the following in fluid communication with the catalyzed soot filter: a diesel oxidation catalyst (DOC) article; a selective catalytic reduction (SCR) article; an NOx storage and reduction (NSR) catalytic article.

Moreover, provided is a method of treating a diesel engine exhaust stream, the exhaust stream containing soot particles, said method comprising contacting the exhaust stream with such catalyzed soot filter, optionally after having directed the exhaust stream through a diesel oxidation catalyst (DOC) article, said DOC article preferably comprising a flow through substrate or a wall-flow substrate.

Further provided is the use of such catalyzed soot filter for the treatment of a diesel engine exhaust stream, optionally in combination with a diesel oxidation catalyst (DOC) article and/or a selective catalytic reduction (SCR) article and/or an NOx storage and reduction (NSR) catalytic article.

BRIEF DESCRIPTION OF DRAWINGS

In FIG. 1,
1 shows the inlet coating.
2 shows the outlet coating having higher washcoat loading than the inlet coating.
3 shows the plug of the filter substrate to close the inlet channel.
4 shows the plug of the filter substrate to close the outlet channel.
The arrow indicates the direction of flow through the CSF.

In FIG. 2,
1 shows the inlet coating.
2 shows the outlet coating having higher washcoat loading than the inlet coating.
3 shows the second outlet coating on top of the outlet coating 2.
4 shows the plug of the filter substrate to close the inlet channel.
5 shows the plug of the filter substrate to close the outlet channel.
The arrow indicates the direction of flow through the CSF.

The arrow indicates the direction of flow through the CSF.

Figure 4:
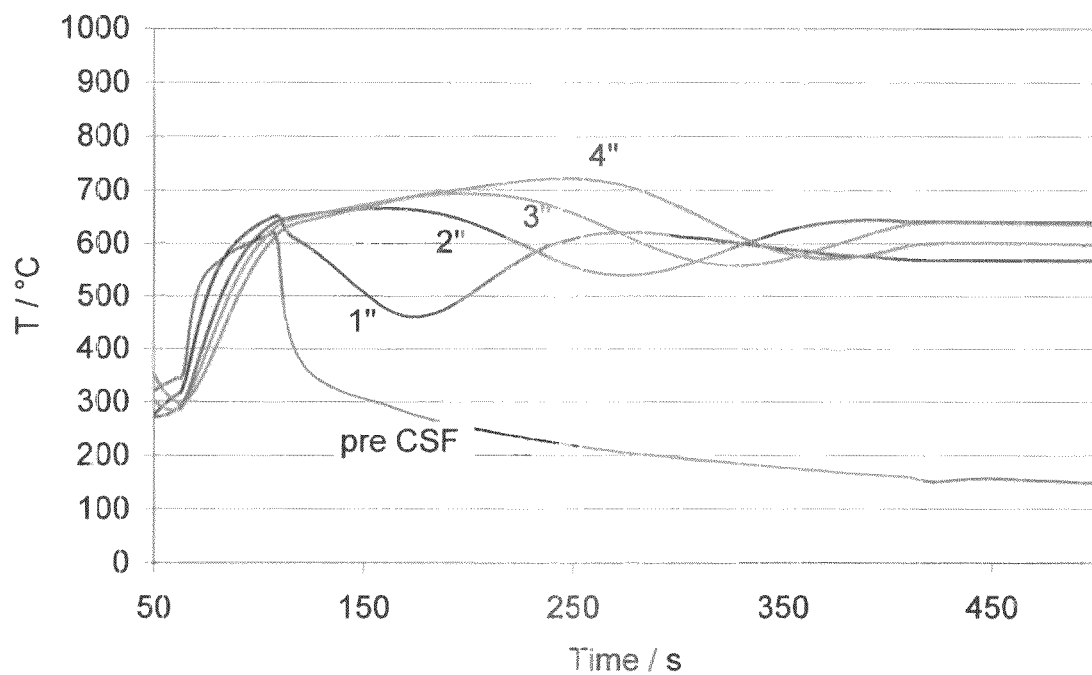

FIG. 4 shows temperature vs. time curve during the drop to idle test for the 4 thermocouples for sample A according to the inventive example. In FIG. 4, thermocouple 1 is identified as 1", thermocouple 2 is identified as 2", thermocouple 3 is identified as 3", and thermocouple 4 is identified as 4".

Figure 5:
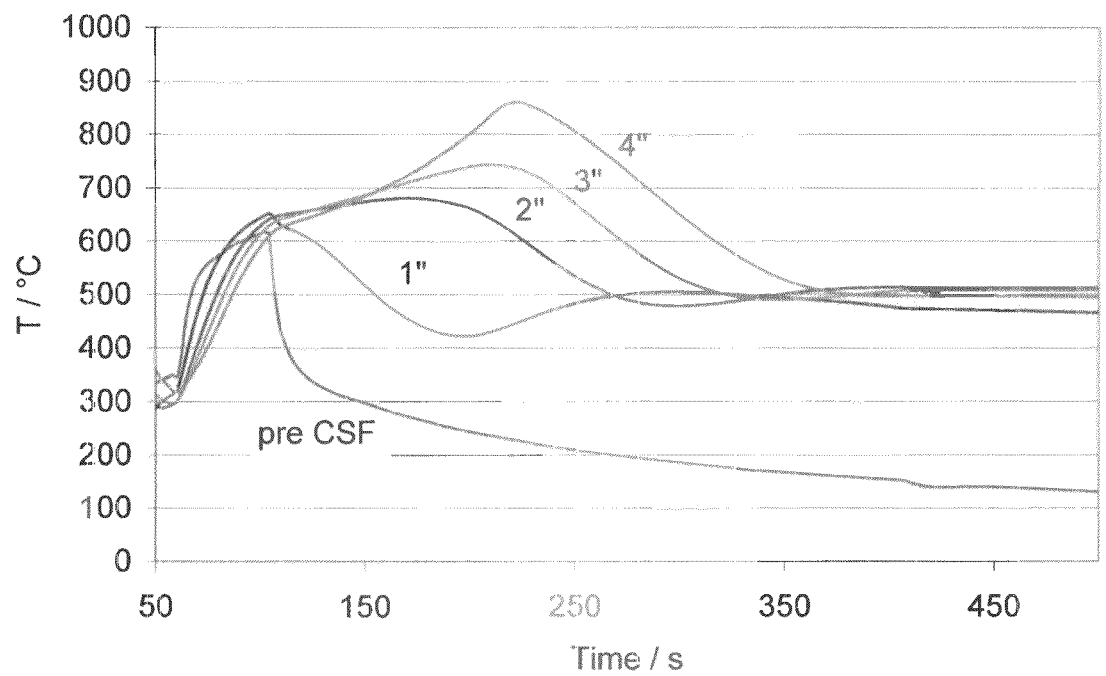

FIG. 5 shows temperature vs. time curve during the drop to idle test for the 4 thermocouples for sample B according to the comparative example. In FIG. 5, thermocouple 1 is identified as 1", thermocouple 2 is identified as 2", thermocouple 3 is identified as 3", and thermocouple 4 is identified as 4".

DETAILED DESCRIPTION

The present invention relates to a catalyzed soot filter, comprising
a wall flow substrate comprising an inlet end, an outlet end, a substrate axial length extending between the inlet end and the outlet end, and a plurality of passages defined by internal walls of the wall flow substrate;
wherein the plurality of passages comprise inlet passages having an open inlet end and a closed outlet end, and outlet passages having a closed inlet end and an open outlet end;
wherein the internal walls of the inlet passages comprise a first inlet coating that extends from the inlet end to a first inlet coating end, thereby defining a first inlet coating length, wherein the first inlet coating length is x % of the substrate axial length with 0<x<100;
wherein the internal walls of the outlet passages comprise a first outlet coating that extends from the outlet end to a first outlet coating end, thereby defining a first outlet coating length, wherein the first outlet coating length is 100-x % of the substrate axial length;
wherein the first inlet coating length defines an upstream zone and the first outlet coating length defines a downstream zone;
wherein the first inlet coating and the first outlet coating are present on the wall flow substrate at a coating loading ratio of less than 0.5, calculated as ratio of the loading of the first inlet coating (g/inch$^3$ (g/(2.54 cm)$^3$)): loading of the first outlet coating (g/inch$^3$ (g/(2.54 cm)$^3$)).

According to a preferred embodiment of the present invention, said first inlet coating contains an oxidation catalyst. According to a further preferred embodiment of the present invention, said first outlet coating contains an oxidation catalyst. More preferably, both the first inlet coating and the first outlet coating comprise an oxidation catalyst.

According to the present invention, the washcoat loading ratio calculated as ratio of the loading of the first inlet coating: loading of the first outlet coating is less than 0.5. Surprisingly, it was found that by applying said first inlet coating and said first outlet coating such that the washcoat loading ratio is less than 0.5, the SML could be increased and the maximum temperature necessary for drop to idle regeneration could be decreased. Further it was found that such washcoat loading ratios of less than 0.5 allowed for a lower frequency of active regeneration of the catalyzed soot filter during driving.

According to preferred embodiments of the present invention, the washcoat loading ratio calculated as ratio of the loading of the first inlet coating:loading of the first outlet coating is less than 0.49, more preferably less than 0.45. More preferably, said washcoat loading ratio is in the range from 0.05 to 0.49, more preferably in the range from 0.1 to 0.45. Still more preferred embodiments are directed to said washcoat loading ratio which is in the range from 0.15 to 0.45, more preferably in the range from 0.15 to 0.40, more preferably in the range from 0.20 to 0.40. Especially preferred are washcoat loading ratios which are in the range from 0.25 to 0.40, more preferably from 0.25 to 0.35, more preferably from 0.30 to 0.35 such as, for example, 0.30, 0.31, 0.32, 0.33, 0.34, 0.35.

The term "washcoat loading" of a given coating as used in the context of the present invention refers to a loading which is determined by weight measurement of the wall flow substrate used according to the present invention before and after having applied the respective washcoat loading, followed by drying and calcination of the catalyzed soot filter as described hereinunder.

According to preferred embodiments of the present invention, the loading of the inlet coating is in the range of from 0.1 to 1 g/inch$^3$ (g/(2.54 cm)$^3$). Even more preferably, said loading is in the range of from 0.1 to 0.5 g/inch$^3$ (g/(2.54 cm)$^3$).

According to the present invention, the first inlet coating length is x % of the substrate axial length with 0<x<100, and the first outlet coating length is 100-x % of the substrate axial length. Consequently, the sum of the first inlet coating length and the first outlet coating length may equal the substrate axial length. It has to be understood, however, that due to manufacturing techniques, the first inlet coating length and the first outlet coating length may overlap through a certain portion ("overlap region"). It is also conceivable that the sum of the first inlet coating length and the first outlet coating length is slightly less than the substrate axial length resulting in a small gap between the first inlet coating end and the first outlet coating end wherein on a given internal wall, a certain portion of said internal wall is neither coated with the first inlet coating nor coated with the first outlet coating ("gap region"). Generally, such gap regions and/or overlap regions of a given internal wall, if present, are at most 1% of the substrate axial length, preferably at most 0.5% of the substrate axial length, more preferably at most 0.1% substrate axial length. Even more preferably, the catalyzed soot filter of the present invention has no such gap regions.

As defined above, the first inlet coating length is x % of the substrate axial length with 0<x<100, and the first outlet coating length is 100-x % of the substrate axial length.

Typically, x is in the range from 1 to 99, preferably from 5 to 95, more preferably from 10 to 90, more preferably from 15 to 85, more preferably from 20 to 80. According to a preferred embodiment of the present invention wherein the catalyzed soot filter contains only one inlet coating and only one outlet coating, i.e. wherein the coatings of the catalyzed soot filter consist of the first inlet coating and the first outlet coating, x is preferably in the range from 25 to 75, more preferably from 30 to 70, more preferably from 35 to 65, more preferably from 40 to 60, more preferably from 45 to 55. In particular, if the coatings of the catalyzed soot filter consist of the first inlet coating and the first outlet coating, x is in the range from 47 to 53 such as 47, 48, 49, 50, 51, 52, or 53, more preferably from 48 to 52, more preferably from 49 to 51.

According to the present invention, the first inlet coating and the first outlet comprise an oxidation catalyst. In this context, the term "oxidation catalyst" as used in this context of the present invention also relates to embodiment wherein in the first inlet coating, at least one oxidation catalyst is comprised, and wherein in the first outlet coating, at least one oxidation catalyst is comprised. The at least one oxidation catalyst comprised in the first inlet coating may be the same or different catalyst as the at least one oxidation catalyst comprised in the first outlet coating.

Preferably, the oxidation catalyst comprised in the first inlet coating is a platinum group metal ("PGM") component.

The term "PGM" as used in the context of the present invention relates to ruthenium (Ru), rhodium (Rh), palladium (Pd), osmium (Os), iridium (Ir), and platinum (Pt). Preferred oxidation catalysts comprised in the first inlet coating are PGM components wherein the PGM is selected from the group consisting of Pt, Pd, Rh, Ir and a mixture of two or more thereof. More preferably, the PGM is selected from the group consisting of Pt, Pd, and a mixture of Pt and Pd. Even more preferably, the PGM consists of a mixture of Pd and Pt.

If the PGM of the first inlet coating contains, preferably consists of a mixture of Pd and Pt, there are no specific restrictions as far as the weight ratio of Pt:Pd is concerned. Typically, the weight ratio in the first inlet coating is in the range of from 10:1 to 1:10, preferably from 9:1 to greater than 1:1, more preferably from 8:1 to 1.1:1, more preferably from 7:1 to 1.2:1, more preferably from 6:1 to 1.3:1, more preferably from 5:1 to 1.4:1, more preferably from 4:1 to 1.5:1.

Typically, the first inlet coating of the catalyzed soot filter of the present invention comprises the oxidation catalyst in an amount of from 5 to 100 g/ft$^3$ (g/(30.48 cm)$^3$), more preferably from 7 to 90 g/ft$^3$, more preferably from 8 to 80 g/ft$^3$, more preferably from 9 to 70 g/ft$^3$, more preferably from 10 to 60 g/ft$^3$. As to the preferred embodiment wherein the oxidation catalyst of the first inlet coating is at least one PGM component, the term "amount of oxidation catalyst" as used in this context of the present invention refers the weight of the at least one PGM in the final catalyzed soot filter, i.e. the catalyzed soot filter after drying and calcination as described hereinunder.

Preferably, the oxidation catalyst comprised in the first outlet coating is a PGM component. Preferred oxidation catalysts comprised in the first outlet coating are PGM components wherein the PGM is selected from the group consisting of Pt, Pd, Rh, Ir and a mixture of two or more thereof. More preferably, the PGM is selected from the group consisting of Pt, Pd, and a mixture of Pt and Pd. Even more preferably, the PGM consists of a mixture of Pd and Pt.

If the PGM of the first outlet coating contains, preferably consists of a mixture of Pd and Pt, there are no specific restrictions as far as the weight ratio of Pt:Pd is concerned. Typically, the weight ratio in the first outlet coating is in the range of from 10:1 to 1:10, preferably from 9:1 to greater than 1:1, more preferably from 8:1 to 1.1:1, more preferably from 7:1 to 1.2:1, more preferably from 6:1 to 1.3:1, more preferably from 5:1 to 1.4:1, more preferably from 4:1 to 1.5:1.

Therefore, the present invention also relates to a catalyzed soot filter as described above, wherein the first inlet coating and the first outlet coating comprise an oxidation catalyst which consists of platinum and palladium, wherein the weight ratio of platinum:palladium in the first inlet coating is in the range of from 10:1 to 1:10, preferably from 4:1 to 1.5:1, and wherein the weight ratio of platinum:palladium in the first outlet coating is in the range of from 10:1 to 1:10, preferably from 4:1 to 1.5:1.

Typically, the first outlet coating of the catalyzed soot filter of the present invention comprises the oxidation catalyst in an amount of from 5 to 100 g/ft$^3$ (g/(30.48 cm)$^3$), more preferably from 7 to 90 g/ft$^3$, more preferably from 8 to 80 g/ft$^3$, more preferably from 9 to 70 g/ft$^3$, more preferably from 10 to 60 g/ft$^3$. As to the preferred embodiment wherein the oxidation catalyst of the first outlet coating is at least one PGM component, the term "amount of oxidation catalyst" as used in this context of the present invention refers the weight of the at least one PGM in the final catalyzed soot filter, i.e. the catalyzed soot filter after drying and calcination as described hereinunder.

According to a first preferred embodiment of the present invention, the oxidation catalyst content, preferably the PGM content, of the upstream zone is lower than the oxidation catalyst content, preferably the PGM content, of the downstream zone. Generally, the PGM ratio, defined as total amount of PGM contained in the first inlet coating (g/ft$^3$ (g/(30.48 cm)$^3$)) divided by the total amount of PGM contained in the first outlet coating (g/ft$^3$ (g/(30.48 cm)$^3$)) is less than 1, preferably in the range of from 1:10 to 1:2. The PGM ratio is preferably in the range of from 1:9 to 1:2, more preferably from 1:8 to 1:3, and more preferably from 1:7 to 1:3.

Surprisingly, it was found that the inventive washcoat loading, together with a PGM content of the first inlet coating which is lower than the PGM content of the first outlet coating has advantages for example as pre-SCR application when a NO$_2$/NOx ratio of e.g., 50% is needed in the catalysed soot filter emissions for the SCR catalyst. In this case only a low PGM loading in the upstream zone is necessary for gas activity, compared to a higher PGM loading in the downstream zone. Thus PGM can be saved in the upstream zone of the catalysed soot filter.

According to a second preferred embodiment of the present invention, the oxidation catalyst content, preferably the PGM content, of the upstream zone is higher than the oxidation catalyst content, preferably the PGM content, of the downstream zone. Generally, the PGM ratio, defined as total amount of PGM contained in the first inlet coating (g/ft$^3$ (g/(30.48 cm)$^3$)) divided by the total amount of PGM contained in the first outlet coating (g/ft$^3$ (g/(30.48 cm)$^3$)) is greater than 1, preferably in the range of from 2:1 to 10:2. The PGM ratio is preferably in the range of from 2:1 to 9:1, more preferably from 3:1 to 8:1, and more preferably from 3:1 to 7:1.

Surprisingly, it was found that the inventive washcoat loading, together with a PGM content of the first inlet coating which is higher than the PGM content of the first outlet coating results in a higher HC/CO gas conversion activity compared to a catalysed soot filter with a homogeneous PGM distribution over the substrate length. Thus, it was found that this embodiment has advantages for example as CSF only application and downstream a DOC, when the catalysed soot filter needs to have a HC/CO gas conversion activity. In this case the PGM loading in the upstream zone is mainly contributing to the gas activity. Thus PGM can be saved in the downstream zone of the catalysed soot filter compared to a catalysed soot filter with a homogeneous PGM distribution over the CSF length.

According to an especially preferred embodiment of the present invention, the oxidation catalyst content, preferably the PGM content, of the upstream zone is higher than the oxidation catalyst content, preferably the PGM content, of the downstream zone.

According to a preferred embodiment of the present invention, the first inlet coating comprises at least one porous support material. While there are no specific restrictions, it is preferred that the porous support material is a refractory metal oxide. More preferably, the porous support material of the first inlet coating is selected from the group consisting of alumina, zirconia, silica, titania, a rare earth metal oxide such as an oxide of cerium, prasedodymium, lanthanum, neodymium and samarium, silica-alumina, alumino-silicates, alumina-zirconia, alumina-chromia, alumina-rare earth metal oxide, titania-silica, titania-zirconia, titania-alumina, and a mixture of two or more thereof. More preferably, the at least one porous support material is selected from the group consisting of Al$_2$O$_3$, ZrO$_2$, CeO$_2$, SiO$_2$ and a mixture of tow or more thereof.

According to a preferred embodiment of the present invention, the first outlet coating comprises at least one porous support material. While there are no specific restrictions, it is preferred that the porous support material is a refractory metal oxide. More preferably, the porous support material of the first outlet coating is selected from the group consisting of alumina, zirconia, silica, titania, a rare earth metal oxide such as an oxide of cerium, prasedodymium, lanthanum, neodymium and samarium, silica-alumina, alumino-silicates, alumina-zirconia, alumina-chromia, alumina-rare earth metal oxide, titania-silica, titania-zirconia, titania-alumina, and a mixture of two or more thereof. More preferably, the at least one porous support material is selected from the group consisting of Al$_2$O$_3$, ZrO$_2$, CeO$_2$, SiO$_2$ and a mixture of tow or more thereof.

Therefore, the present invention also relates to a catalyzed soot filter as described hereinabove, wherein the first inlet coating and the first outlet coating comprise at least one porous support material, wherein the at least one porous support material of the first inlet coating is preferably selected from the group consisting of Al$_2$O$_3$, ZrO$_2$, CeO$_2$, SiO$_2$ and a mixture of tow or more thereof, and wherein the at least one porous support material of the first outlet coating is preferably selected from the group consisting of Al$_2$O$_3$, ZrO$_2$, CeO$_2$, SiO$_2$ and a mixture of tow or more thereof.

According to a preferred embodiment, the refractory metal oxide of the first inlet coating and/or the first outlet coating essentially consists of alumina, more preferably of gamma alumina or activated alumina, such as gamma or eta alumina. Preferably, the activated alumina has a specific surface area, determined according to BET surface area measurement according to DIN 66131, of from 60 to 300 m$^2$/g, preferably from 90 to 200 m$^2$/g, more preferably from 100 to 180 m$^2$/g.

Wall flow substrates useful for the catalyzed soot filter of the present invention have a plurality of fine, substantially parallel flow passages extending along the longitudinal axis of the substrate. Each passage is blocked at one end of the substrate body, with alternate passages blocked at opposite end-faces. Such monolithic carriers may contain up to about 400 flow passages (or "cells") per square inch ((2.54 cm)$^2$) of cross section, although far fewer may be used. For example, the carrier may have from 7 to 400, preferably from 100 to 400, cells per square inch ("cpsi"). The cells can have cross sections that are rectangular, square, circular, oval, triangular, hexagonal, or are of other polygonal shapes.

Preferred wall flow substrates are composed of ceramic-like materials such as cordierite, alpha-alumina, silicon carbide, silicon nitride, zirconia, mullite, spodumene, alumina-silica-magnesia or zirconium silicate, or of refractory metals such as stainless steel. Preferred wall flow substrates are formed from cordierite and silicon carbide. Such materials are able to withstand the environment, particularly high temperatures, encountered in treating the exhaust streams. Ceramic wall flow substrates are typically formed of a material having a porosity of about 40 to 70. The term "porosity" as used in this context is understood as being determined according to mercury porosity measurement according to DIN 66133.

According to the present invention, wall flow substrates are preferred having a porosity in the range from 38 to 75, more preferably from 55 to 70.

For instance in some configurations, a wall flow substrate having a porosity of 60 and a mean pore diameter of about 15-25 microns provide adequate exhaust flow. Other specific embodiments are, for example, configurations that use wall flow substrates with 100 cpsi that have a 17 mil wall (1 mil corresponds to 0.0254 mm), and wall flow substrate with 300 cpsi and a 12-14 mil.

Generally, there are no restrictions as to the substrate axial lengths of the catalyzed soot filter of the present invention. Substrate axial lengths will mainly depend on the intended use of the catalyzed soot filter of the present invention. Typical substrate axial lengths of catalyzed soot filter used, for example, in the automotive area are in the range of from 4 to 10, preferably from 6 to 8 inches (1 inch=2.54 cm).

Each of the coatings of the present invention present on the wall flow substrate is formed from a respective washcoat composition that contains the at least one porous support material as described above. Other additives such as binders and stabilizers can also be included in the washcoat composition. Such stabilizers can be included in either the first inlet coating or in the first outlet coating or in further outlet coatings, as described hereinunder. As disclosed in U.S. Pat. No. 4,727,052, porous support materials, such as activated alumina, can be thermally stabilized to retard undesirable alumina phase transformations from gamma to alpha at elevated temperatures. Stabilizers can be selected from at least one alkaline earth metal components selected from the group consisting of magnesium, barium, calcium and strontium, preferably strontium and barium. When present, stabilizers materials are added at from about 0.01 g/in$^3$ (g/(2.54 cm)$^3$) to 0.15 g/in$^3$ (g/(2.54 cm)$^3$) in the coating.

A given coating is disposed on the surface of the internal walls. Further, it is conceivable that a given coating is disposed on another coating which had been applied onto the surface of the internal walls or onto yet another coating. Embodiments of the present invention with two or more coatings, in particular two or more outlet coatings, are described hereinunder. Further, a given coating may partially permeate the porous internal walls or the coating onto which it is applied.

A given washcoat can be applied as coating according to any conceivable method. For example, it is conceivable to apply a washcoat by spraying a washcoat onto the internal walls of the wall flow substrate. According to the present invention, it is preferred to apply a given washcoat onto the internal walls of the wall flow substrate by dip-coating.

In particular if PGM components are used as oxidation catalysts, a washcoat composition to be applied onto the internal walls of the wall flow substrate is preferably prepared by dispersing a suitable PGM component precursor on the a suitable porous support material, preferably a suitable refractory metal oxide as described hereinabove. More preferably, a water-soluble or water-dispersible PGM component precursor is impregnated on a suitable porous support material, preferably a suitable refractory metal oxide, followed by drying and fixing steps. Suitable PGM component precursors include, for example, potassium platinum chloride, ammonium platinum thiocyanate, amine-solubilized platinum hydroxide, chloroplatinic acid, palladium nitrate, rhodium chloride, rhodium nitrate, hexamine rhodium chloride, and the like. Other suitable PGM component precursors will be apparent to those of skill in the art. The impregnated support material is preferably dried with the PGM component fixed thereon. Generally, drying temperatures are in the range from 60 to 250° C., preferably from 90 to 210° C., more preferably from 100 to 150° C. Drying can be carried out in any suitable atmosphere, with nitrogen or air. After drying, it is preferred to finally fix the PGM component on the support material by suitable calcination and/or other suitable methods such as treatment with acetic acid. In general, any method resulting in the PGM component being in water-insoluble form is suitable. Generally, calcination temperatures are in the range from 250 to 800° C., preferably from 350 to 700° C., more preferably from 400 to 600° C. Calcination can be carried out in any suitable atmosphere, with nitrogen or air. By, for example, calcination, the catalytically active elemental PGM or its oxide is obtained. It is to be understood that the term "PGM component" present in the final catalyzed soot filter as used in the context of the present invention relates to the PGM in the form of the catalytically active elemental PGM, or the oxide thereof, or the mixture of elemental PGM and the oxide thereof.

Thus, the present invention also relates to a process for manufacturing a catalyzed soot filter as described hereinabove, the process comprising (i) providing a wall flow substrate, preferably having a porosity in the range of from 38 to 75, determined according to mercury porosity measurement according to DIN 66133, said wall flow substrate comprising an inlet end, an outlet end, a substrate axial length extending between the inlet end and the outlet end, and a plurality of passages defined by internal walls of the wall flow substrate;
wherein the plurality of passages comprise inlet passages having an open inlet end and a closed outlet end, and outlet passages having a closed inlet end and an open outlet end;

(ii) applying the first inlet coating to the internal walls of the inlet passages such that the first inlet coating extends from the inlet end to the first inlet coating end whereby a first inlet coating length is defined, wherein the first inlet coating length is x % of the substrate axial length with 0<x<100, thereby adjusting the loading of the first inlet coating to a predetermined value which is preferably in the range of from 0.1 to 1 g/inch$^3$ (g/(2.54 cm)$^3$);

(iii) before (ii) or simultaneously with (ii) or after (ii), applying the first outlet coating to the internal walls of the outlet passages such that the first outlet coating extends from the outlet end to the first outlet coating end whereby a first outlet coating length is defined, wherein the first outlet coating length is 100-x % of the substrate axial length, thereby adjusting the loading of the first outlet coating to a value so that the coating loading ratio, calculated as ratio of the loading of the first inlet coating (g/inch$^3$ (g/(2.54 cm)$^3$)): loading of the first outlet coating (g/inch$^3$ (g/(2.54 cm)$^3$)) is less than 0.5, preferably in the range of from 0.10 to 0.45, more preferably from 0.20 to 0.40, more preferably from 0.30 to 0.35.

According to a preferred embodiment of the present invention, said first inlet coating contains an oxidation catalyst. According to a further preferred embodiment of the present invention, said first outlet coating contains an oxidation catalyst. More preferably, both the first inlet coating and the first outlet coating comprise an oxidation catalyst.

According to an embodiment of the present invention, the catalyzed soot filter contains a first inlet coating, a first outlet coating, and additionally comprises at least one further outlet coating. Generally, the catalyzed soot filter of the present invention may additionally contain k further outlet coatings, with k being an integer with k≥1. Preferably, the catalyzed soot filter of the present invention may contain up to 9, more preferably up to 7, more preferably up to 5, and more preferably up to 3 additional outlet coatings, such as 1, 2, or 3 additional outlet coating.

Most preferably, the (j+1)$^{th}$ outlet coating of the catalyzed soot filter of the present invention is located on top of the j$^{th}$ outlet coating. By way of example, if the catalyzed soot filter contains 3 additional outlet coatings, the second outlet coating, i.e. the first additional outlet coating (wherein j=1) is located on top of the first outlet coating, the third outlet coating, i.e. the second additional outlet coating (wherein j=2) is located on top of the second outlet coating, and the fourth outlet, i.e. the third additional outlet coating (wherein j=3) is located on top of the third outlet coating.

Typically, a given additional outlet coating extends from the (overall) outlet end of the catalyzed soot filter to the respective end of this outlet coating. Thus, the length of this outlet coating is defined. Generally speaking, the $(j+1)^{th}$ outlet coating of the catalyzed soot filter of the present invention extends from the outlet end to a $(j+1)^{th}$ outlet coating end, thereby defining a $(j+1)^{th}$ outlet coating length.

Generally, it is conceivable that the outlet coating length of a given outlet coating is smaller or equal to the outlet coating length of the outlet coating on which said given outlet coating is located. By way of example, if the catalyzed soot filter contains 3 additional outlet coatings, the second outlet coating, i.e. the first additional outlet coating (wherein j=1) is located on top of the first outlet coating wherein the second outlet coating length is smaller or equal to the first outlet coating length, the third outlet coating, i.e. the second additional outlet coating (wherein j=2) is located on top of the second outlet coating wherein the third outlet coating length is smaller or equal to the second outlet coating length, and the fourth outlet, i.e. the third additional outlet coating (wherein j=3) is located on top of the third outlet coating wherein the fourth outlet coating length is smaller or equal to the third outlet coating length. Generally speaking, the $(j+1)^{th}$ outlet coating length is $y_{j+1}$% of the $j^{th}$ outlet coating length with $0<y_{j+1}\leq 100$.

Therefore, the present invention also relates to a catalyzed soot filter as described hereinabove, the catalyzed soot filter additionally comprising k further outlet coatings, wherein the $(j+1)^{th}$ outlet coating is located on top of the $j^{th}$ outlet coating, said $(j+1)^{th}$ outlet coating extending from the outlet end to a $(j+1)^{th}$ outlet coating end, thereby defining a $(j+1)^{th}$ outlet coating length, wherein the $(j+1)^{th}$ outlet coating length is $y_{j+1}$% of the $j^{th}$ outlet coating length with $0<y_{j+1}\leq 100$;

wherein k is an integer with k≥1, k preferably being in the range of from 1 to 4, more preferably from 1 to 3; and wherein j is an integer with 1≤j≤k.

As described above, the outlet coating length of a given outlet coating is smaller than or equal to the length of the outlet coating on which said given outlet coating is located. Generally, the $(j+1)^{th}$ outlet coating length is $y_{j+1}$% of the $j^{th}$ outlet coating length with $0<y_{j+1}\leq 100$. According to preferred embodiments of the present invention, the outlet coating length of a given outlet coating is smaller than the length of the outlet coating on which said given outlet coating is located. Thus, preferably, $0<y_{j+1}<100$. Still more preferably, the outlet coatings will form a somewhat regular "staircase-shaped" structure wherein, depending on the first outlet coating length, a given length of an additional outlet coating has a specific length. Namely, the $(j+1)^{th}$ outlet coating length is $100\cdot(1-j/(k+1))$ % of the first outlet coating length.

Generally, as described above, the first inlet coating length is x % of the substrate axial length with $0<x<100$. In case the catalyzed soot filter of the present invention contains at least one additional outlet coating, i.e. in total at least two outlet coatings, also the first inlet coating length is chosen so as to form, together with staircase-shaped structure of the outlet coatings, a regular staircase-shaped pattern, with each of the steps having essentially the same length. Therefore, according to a preferred embodiment of the present invention, x is $100/(k+2)$.

If the catalyzed soot filter of the present invention contains one or more additional outlet coatings, a given outlet coating may have the same chemical composition as one or all of the other outlet coatings. It is also possible that all outlet coatings have different chemical compositions.

It is preferred that at least one, preferably each of the further k outlet coatings comprises an oxidation catalyst. Preferably, the oxidation catalyst comprised in a further outlet coating comprises at least one platinum group metal (PGM). More preferably, the oxidation catalyst comprised in a further outlet coating is selected from the group consisting of platinum, palladium, rhodium, iridium, and a mixture of two or more thereof. Each outlet coating may comprise the same or a different oxidation catalyst. More preferably, the oxidation catalyst of the at least one, preferably of each of the further k outlet coatings consists of a mixture of platinum and palladium.

In case the catalyzed soot filter of the present invention contains two or more outlet coatings, it is preferred that the outlet coatings in total, namely the k+1 outlet coatings in total comprise the oxidation catalyst in an amount of from 5 to 100 $g/ft^3$, more preferably from 7 to 90 $g/ft^3$, more preferably from 8 to 80 $g/ft^3$, more preferably from 9 to 70 $g/ft^3$, preferably from 10 to 60 $g/ft^3$ ($g/(30.48\text{ cm})^3$). As to the preferred embodiment wherein the oxidation catalyst of the outlets coating is at least one PGM component, the term "amount of oxidation catalyst" as used in this context of the present invention refers the weight of the at least one PGM in the final catalyzed soot filter, i.e. the catalyzed soot filter after drying and calcination.

Further, in case the catalyzed soot filter of the present invention contains two or more outlet coatings, it is preferred that the PGM ratio, defined as amount of PGM contained in the first inlet coating ($g/ft^3$ ($g/(30.48\text{ cm})^3$)) divided by the total amount of PGM contained in the k+1 outlet coatings ($g/ft^3$ ($g/(30.48\text{ cm})^3$)) is in the range of from 1:10 to 1:2. The PGM ratio is preferably in the range of from 1:9 to 1:2, more preferably from 1:8 to 1:3, and more preferably from 1:7 to 1:3, preferably in the range of from 1:7 to 1:3.

According to another embodiment, in case the catalyzed soot filter of the present invention contains two or more outlet coatings, it is preferred that the PGM ratio, defined as amount of PGM contained in the first inlet coating ($g/ft^3$ ($g/(30.48\text{ cm})^3$)) divided by the total amount of PGM contained in the k+1 outlet coatings ($g/ft^3$ ($g/(30.48\text{ cm})^3$)) is in the range of from 2:1 to 10:1. The PGM ratio is preferably in the range of from 2:1 to 9:1, more preferably from 3:1 to 8:1, and more preferably from 3:1 to 7:1.

As described hereinabove, it is preferred that the first inlet coating and each of the outlet coatings in case the catalyzed soot filter of the present invention contains an oxidation catalyst which most preferably consists of a mixture palladium and platinum. Typically, the weight ratio Pt:Pd in the first outlet coating is in the range of from 10:1 to 1:10, preferably from 9:1 to greater than 1:1, more preferably from 8:1 to 1.1:1, more preferably from 7:1 to 1.2:1, more preferably from 6:1 to 1.3:1, more preferably from 5:1 to 1.4:1, more preferably from 4:1 to 1.5:1, as described hereinabove. Further, it is preferred that the weight ratio of platinum:palladium in the k+1 outlet coating is in the range of from 10:1 to 1:10, preferably from 9:1 to greater than 1:1, more preferably from 8:1 to 1.1:1, more preferably from 7:1 to 1.2:1, more preferably from 6:1 to 1.3:1, more preferably from 5:1 to 1.4:1, more preferably from 4:1 to 1.5:1.

Therefore, the present invention also relates to a catalyzed soot filter as described hereinabove, wherein the first inlet coating and the k+1 outlet coatings comprise an oxidation catalyst which consists of platinum and palladium, wherein the weight ratio of platinum:palladium in the first inlet coating is in the range of from 10:1 to 1:10, preferably from 4:1 to 1.5:1, and wherein the weight ratio of platinum:palladium in the k+1 outlet coating is in the range of from 10:1 to 1:10, preferably from 4:1 to 1.5:1.

It is also possible that in the k+1 outlet coatings, only platinum or only palladium is contained.

According to a preferred embodiment of the present invention, at least one of the further outlet coatings, preferably each of the further outlet coatings comprises at least one porous support material. If a given further outlet coating comprises at least one porous material, it may contain the same or a different porous material compared to another outlet coating. More preferably, all outlet coatings comprise at least one porous material. While there are no specific restrictions, it is preferred that the porous support material comprised in the further outlet coatings is a refractory metal oxide. More preferably, the porous support material of the at least one further outlet coatings, preferably of each of the further outlet coatings, is selected from the group consisting of alumina, zirconia, silica, titania, a rare earth metal oxide such as an oxide of cerium, praseodymium, lanthanum, neodymium and samarium, silica-alumina, alumino-silicates, alumina-zirconia, alumina-chromia, alumina-rare earth metal oxide, titania-silica, titania-zirconia, titania-alumina, and a mixture of two or more thereof. More preferably, the at least one porous support material is selected from the group consisting of $Al_2O_3$, $ZrO_2$, $CeO_2$, $SiO_2$ and a mixture of tow or more thereof.

Thus, the present invention also relates to a catalyzed soot filter as described hereinabove, wherein at least one, preferably each of the k further outlet coatings comprises at least one porous support material, wherein the at least one porous support material of the at least one, preferably of each of the k further outlet coating is preferably selected from the group consisting of $Al_2O_3$, $ZrO_2$, $CeO_2$, $SiO_2$ and a mixture of tow or more thereof.

Therefore, the present invention also relates to a catalyzed soot filter as described hereinabove, wherein the first inlet coating and the outlet coatings comprise at least one porous support material, wherein the at least one porous support material of the first inlet coating is preferably selected from the group consisting of $Al_2O_3$, $ZrO_2$, $CeO_2$, $SiO_2$ and a mixture of tow or more thereof, and wherein the at least one porous support material of the outlet coatings is preferably selected from the group consisting of $Al_2O_3$, $ZrO_2$, $CeO_2$, $SiO_2$ and a mixture of tow or more thereof.

According to a preferred embodiment, the refractory metal oxide of the first inlet coating and/or the outlets coating essentially consists of alumina, more preferably of gamma alumina or activated alumina, such as gamma or eta alumina. Preferably, the activated alumina has a specific surface area, determined according to BET surface area measurement according to DIN 66131, of from 60 to 300 m²/g, preferably from 90 to 200 m²/g, more preferably from 100 to 180 m²/g.

According to an even more preferred embodiment of the present invention, each of the outlet coatings has the same chemical composition, i.e. in the process for the preparation of the catalyzed soot filter of the present invention, coating the wall flow substrate with the k+1 outlet coatings is carried out using one specific washcoat composition. More preferably, all coatings, i.e. the first inlet coating and all outlet coatings have the same chemical composition.

In case the catalyzed soot filter of the present invention comprises one or more further outlet coatings, i.e. at least two outlet coatings, the first inlet coating and the outlet coatings are present on the wall flow substrate at a coating loading ratio of less than 0.5, calculated as ratio of the loading of the first inlet coating (g/inch³ (g/(2.54 cm)³)):total loading of all outlet coatings (g/inch³ (g/(2.54 cm)³)).

As far as the process for manufacturing the catalyzed soot filter of the present invention is concerned which comprises two or more outlet coatings, essentially the same process is carried out as described hereinabove for the catalyzed soot filter comprising a first inlet coating only. However, after step (iii), the at least one further outlet coating is applied onto the first outlet coating. Preferably, after having applied the first inlet coating, optionally after a first drying and/or calcination, the second outlet coating is applied onto the first outlet coating. If a third outlet coating is applied, it is preferred, optionally after drying and/or calcination the filter containing the first and second outlet coatings, to apply the third outlet coating onto the second outlet coating. Therefore, the present invention also relates to a process as described hereinabove, wherein said process further comprises (iv) after (iii), applying k further outlet coatings, wherein the $(j+1)^{th}$ outlet coating is applied onto the $j^{th}$ outlet coating so that the $(j+1)^{th}$ outlet coating extends from the outlet end to a $(j+1)^{th}$ outlet coating end, thereby defining a $(j+1)^{th}$ outlet coating length and the $(j+1)^{th}$ outlet coating length is $y_{j+1}$% of the $j^{th}$ outlet coating length with $0<y_{j+1}\le 100$;
  wherein k is an integer with k≥1, k preferably being in the range of from 1 to 4, more preferably from 1 to 3; and
wherein j is an integer with $1\le j\le k$.

More preferably, the $(j+1)^{th}$ outlet coating is applied onto the $j^{th}$ outlet coating so that the $(j+1)^{th}$ outlet coating length is $100\cdot(1-j/(k+1))$ % of the first outlet coating length. Even more preferably, in (ii), the first inlet coating is applied so that x is $100/(k+2)$.

As far as typical and preferred methods of applying the k further outlet coatings are concerned, reference can be made to the typical and preferred methods as described hereinabove for the application of the first outlet coating. As far as typical and preferred conditions applied during the drying and/or calcination steps between or after application of the individual outlet coatings are concerned, reference can be made to the typical and preferred conditions described hereinabove for drying and/or calcination of the first outlet coating.

The catalyzed soot filter of the present invention can be used in an integrated emission treatment system, in particular an exhaust conduit comprising one or more additional components for the treatment of diesel exhaust emissions. For example, such exhaust conduit which is most preferably in fluid communication with the diesel engine may comprise a catalyzed soot filter according to the present invention and may further comprise a diesel oxidation catalyst (DOC) article and/or a selective catalytic reduction (SCR) article and/or an NOx storage and reduction (NSR) catalytic article. Most preferably, the DOC article and/or the SCR article and/or the NSR article are in fluid communication with the catalyzed soot filter. The diesel oxidation catalyst can be located upstream or downstream from the catalyzed soot filter and/or selective catalytic reduction component. More preferably, the catalyzed soot filter of the present invention is located downstream from the DOC article. Still more preferably the catalyzed soot filter of the present invention is located either upstream or downstream of the SCR article.

Therefore, the present invention also relates to a system for treating a diesel engine exhaust stream, the system comprising
an exhaust conduit in fluid communication with the diesel engine via an exhaust manifold;
the catalyzed soot filter as described hereinabove; and one or more of the following in fluid communication with the catalyzed soot filter: a diesel oxidation catalyst (DOC) article; a selective catalytic reduction (SCR) article; an NOx storage and reduction (NSR) catalytic article.

A suitable SCR article for use in the exhaust conduit is typically able to effectively catalyze the reduction of the NOx component comprised in the diesel exhaust at temperatures below 600° C., so that adequate NOx levels can be treated even under conditions of low load which typically are associated with lower exhaust temperatures. Preferably, a suitable SCR article is capable of converting at least 50% of the NOx component to $N_2$, depending on the amount of suitable reductant added to the system. Another desirable attribute for the SCR article is that it possesses the ability to catalyze the reaction of $O_2$ with any excess $NH_3$ to $N_2$ and $H_2O$, so that $NH_3$ is not emitted to the atmosphere. Useful SCR catalyst compositions used in the exhaust conduit should also have thermal resistance to temperatures greater than 650° C. Such high temperatures may be encountered during regeneration of the upstream catalyzed soot filter. Suitable SCR articles are described, for instance, in U.S. Pat. Nos. 4,961,917 and 5,516,497. Suitable SCR articles include one or both of an iron and a copper promoter typically present in a zeolite in an amount of from about 0.1 to 30 percent by weight, preferably from about 1 to 5 percent by weight, of the total weight of promoter plus zeolite. In addition to their ability to catalyze the reduction of NOx with $NH_3$ to $N_2$, the disclosed SCR articles can also promote the oxidation of excess $NH_3$ with $O_2$, especially for those compositions having higher promoter concentrations.

The exhaust gas treatment system of the present invention may further comprise a NOx storage (and optionally reduction) article. The NOx storage (and optionally reduction) article is preferably located downstream of the catalyzed soot filter.

Further, the present invention also relates to a method of treating a diesel engine exhaust stream, the exhaust stream containing soot particles, said method comprising contacting the exhaust stream with the catalyzed soot filter as described hereinabove, optionally after having directed the exhaust stream through a diesel oxidation catalyst (DOC) article, said DOC article preferably comprising a flow through substrate or a wall-flow substrate. This method optionally further comprises directing the exhaust stream resulting from the DOC article or from the catalyzed soot filter through a selective catalytic reduction (SCR) article.

The present invention includes the following embodiments, wherein these include the specific combinations of embodiments as indicated by the interdependencies defined therein:

1. A catalyzed soot filter, comprising
    a wall flow substrate comprising an inlet end, an outlet end, a substrate axial length extending between the inlet end and the outlet end, and a plurality of passages defined by internal walls of the wall flow substrate;
    wherein the plurality of passages comprise inlet passages having an open inlet end and a closed outlet end, and outlet passages having a closed inlet end and an open outlet end;
    wherein the internal walls of the inlet passages comprise a first inlet coating that extends from the inlet end to a first inlet coating end, thereby defining a first inlet coating length, wherein the first inlet coating length is x % of the substrate axial length with 0<x<100;
    wherein the internal walls of the outlet passages comprise a first outlet coating that extends from the outlet end to a first outlet coating end, thereby defining a first outlet coating length, wherein the first outlet coating length is 100-x % of the substrate axial length;
    wherein the first inlet coating length defines an upstream zone and the first outlet coating length defines a downstream zone;
    wherein the first inlet coating and the first outlet coating are present on the wall flow substrate at a coating loading ratio of less than 0.5, calculated as ratio of the loading of the first inlet coating (g/inch$^3$ (g/(2.54 cm)$^3$)): loading of the first outlet coating (g/inch$^3$ (g/(2.54 cm)$^3$)).

2. The catalyzed soot filter of embodiment 1, wherein the first inlet coating contains an oxidation catalyst and wherein the first outlet coating contains an oxidation catalyst.

3. The catalyzed soot filter of embodiment 1 or 2, wherein the coating loading ratio is in the range of from 0.10 to 0.45, preferably from 0.20 to 0.40, more preferably from 0.30 to 0.35.

4. The catalyzed soot filter of any of embodiments 1 to 3, wherein x is in the range of from 25 to 75, preferably from 35 to 65, more preferably from 45 to 55.

5. The catalyzed soot filter of any of embodiments 1 to 4, wherein the first inlet coating comprises an oxidation catalyst comprising at least one platinum group metal (PGM), preferably selected from the group consisting of platinum, palladium, rhodium, iridium, and a mixture of two or more thereof, and wherein the oxidation catalyst of the first inlet coating more preferably consists of a mixture of platinum and palladium.

6. The catalyzed soot filter of any of embodiments 1 to 5, wherein the first inlet coating comprises the oxidation catalyst in an amount of from 5 to 100 g/ft$^3$ (g/(30.48 cm)$^3$), preferably from 10 to 60 g/ft$^3$ (g/(30.48 cm)$^3$).

7. The catalyzed soot filter of any of embodiments 1 to 6, wherein the first outlet coating comprises an oxidation catalyst comprising at least one platinum group metal (PGM), preferably selected from the group consisting of platinum, palladium, rhodium, iridium, and a mixture of two or more thereof, and wherein the oxidation catalyst of the first outlet coating more preferably consists of a mixture of platinum and palladium.

8. The catalyzed soot filter of any of embodiments 2 to 7, wherein the first outlet coating comprises the oxidation catalyst in an amount of from 5 to 100 g/ft$^3$ (g/(30.48 cm)$^3$), preferably from 10 to 60 g/ft$^3$ (g/(30.48 cm)$^3$).

9. The catalyzed soot filter of any of embodiments 5 to 8, wherein the PGM ratio, defined as total amount of PGM contained in the first inlet coating (g/ft$^3$ (g/(30.48 cm)$^3$)) divided by the total amount of PGM contained in the first outlet coating (g/ft$^3$ (g/(30.48 cm)$^3$)) is in the range of from 1:10 to 1:2, preferably in the range of from 1:7 to 1:3.

10. The catalyzed soot filter of any of embodiments 5 to 8, wherein the PGM ratio, defined as total amount of PGM contained in the first inlet coating (g/ft$^3$ (g/(30.48 cm)$^3$)) divided by the total amount of PGM contained in the first outlet coating (g/ft$^3$ (g/(30.48 cm)$^3$)) is in the range of from 2:1 to 10:1, preferably from 3:1 to 7:1.

11. The catalyzed soot filter of any of embodiments 1 to 10, wherein the first inlet coating and the first outlet coating comprise an oxidation catalyst which consists of platinum and palladium, wherein the weight ratio of platinum:palladium in the first inlet coating is in the range of from 10:1 to 1:10, preferably from 4:1 to 1.5:1, and wherein the weight ratio of platinum:palladium in the first outlet coating is in the range of from 10:1 to 1:10, preferably from 4:1 to 1.5:1.

12. The catalyzed soot filter of any of embodiments 1 to 11, wherein the first inlet coating and the first outlet coating comprise at least one porous support material, wherein the at least one porous support material of the first inlet coating is preferably selected from the group consisting of $Al_2O_3$, $ZrO_2$, $CeO_2$, $SiO_2$ and a mixture of tow or more thereof, and wherein the at least one porous support material of the first outlet coating is preferably selected from the group consisting of $Al_2O_3$, $ZrO_2$, $CeO_2$, $SiO_2$ and a mixture of tow or more thereof.

13. The catalyzed soot filter of any of embodiments 1 to 12, additionally comprising k further outlet coatings,
   wherein the $(j+1)^{th}$ outlet coating is located on top of the $j^{th}$ outlet coating, said $(j+1)^{th}$ outlet coating extending from the outlet end to a $(j+1)^{th}$ outlet coating end, thereby defining a $(j+1)^{th}$ outlet coating length,
   wherein the $(j+1)^{th}$ outlet coating length is $y_{j+1}$% of the $j^{th}$ outlet coating length with $0<y_{j+1}\leq 100$;
   wherein k is an integer with $k\geq 1$, k preferably being in the range of from 1 to 4, more preferably from 1 to 3; and
   wherein j is an integer with $1\leq j\leq k$.

14. The catalyzed soot filter of embodiment 13, wherein the $(j+1)^{th}$ outlet coating length is $100\cdot(1-j/(k+1))$% of the first outlet coating length.

15. The catalyzed soot filter of embodiment 13 or 14, wherein x is $100/(k+2)$.

16. The catalyzed soot filter of any of embodiments 13 to 15, wherein at least one, preferably each of the further k outlet coatings comprises an oxidation catalyst comprising at least one platinum group metal (PGM), preferably selected from the group consisting of platinum, palladium, rhodium, iridium, and a mixture of two or more thereof, and wherein the oxidation catalyst of the at least one, preferably of each of the further k outlet coatings more preferably consists of a mixture of platinum and palladium.

17. The catalyzed soot filter of any of embodiments 13 to 16, wherein the k+1 outlet coatings in total comprise the oxidation catalyst in an amount of from 5 to 100 $g/ft^3$ ($g/(30.48\ cm)^3$), preferably from 10 to 60 $g/ft^3$ ($g/(30.48\ cm)^3$).

18. The catalyzed soot filter of any of embodiments 13 to 17, wherein the PGM ratio, defined as amount of PGM contained in the first inlet coating ($g/ft^3$ ($g/(30.48\ cm)^3$)) divided by the total amount of PGM contained in the k+1 outlet coatings ($g/ft^3$ ($g/(30.48\ cm)^3$)) is in the range of from 1:10 to 1:2, preferably in the range of from 1:7 to 1:3.

19. The catalyzed soot filter of any of embodiments 13 to 17, wherein the PGM ratio, defined as amount of PGM contained in the first inlet coating ($g/ft^3$ ($g/(30.48\ cm)^3$)) divided by the total amount of PGM contained in the k+1 outlet coatings ($g/ft^3$ ($g/(30.48\ cm)^3$)) is in the range of from 2:1 to 10:1, preferably from 3:1 to 7:1.

20. The catalyzed soot filter of any of embodiments 13 to 19, wherein the first inlet coating and the k+1 outlet coatings comprise an oxidation catalyst which consists of platinum and palladium, wherein the weight ratio of platinum:palladium in the first inlet coating is in the range of from 10:1 to 1:10, preferably from 4:1 to 1.5:1, and wherein the weight ratio of platinum:palladium in the k+1 outlet coating is in the range of from 10:1 to 1:10, preferably from 4:1 to 1.5:1.

21. The catalyzed soot filter of any of embodiments 13 to 22, wherein at least one, preferably each of the k further outlet coatings comprises at least one porous support material, wherein the at least one porous support material of the at least one, preferably of each of the k further outlet coating is preferably selected from the group consisting of $Al_2O_3$, $ZrO_2$, $CeO_2$, $SiO_2$ and a mixture of tow or more thereof.

22. The catalyzed soot filter of any of embodiments 1 to 21, wherein the wall flow substrate has a porosity in the range of from 38 to 75, determined according to mercury porosity measurement according to DIN 66133, wherein the wall flow substrate is preferably a cordierite substrate or a silicon carbide substrate.

23. The catalyzed soot filter of any of embodiments 1 to 22, wherein the loading of the first inlet coating is in the range of from 0.1 to 1 $g/inch^3$ ($g/(2.54\ cm)^3$), preferably from 0.1 to 0.5 $g/inch^3$ ($g/(2.54\ cm)^3$).

24. A process for manufacturing a catalyzed soot filter of any of embodiment 1 to 23, comprising
   (i) providing a wall flow substrate, preferably having a porosity in the range of from 38 to 75, determined according to mercury porosity measurement according to DIN 66133, said wall flow substrate comprising an inlet end, an outlet end, a substrate axial length extending between the inlet end and the outlet end, and a plurality of passages defined by internal walls of the wall flow substrate;
      wherein the plurality of passages comprise inlet passages having an open inlet end and a closed outlet end, and outlet passages having a closed inlet end and an open outlet end;
   (ii) applying the first inlet coating to the internal walls of the inlet passages such that the first inlet coating extends from the inlet end to the first inlet coating end whereby a first inlet coating length is defined, wherein the first inlet coating length is x % of the substrate axial length with $0<x<100$, thereby adjusting the loading of the first inlet coating to a predetermined value which is preferably in the range of from 0.1 to 1 $g/inch^3$ ($g/(2.54\ cm)^3$);
   (iii) before (ii) or simultaneously with (ii) or after (ii), applying the first outlet coating to the internal walls of the outlet passages such that the first outlet coating extends from the outlet end to the first outlet coating end whereby a first outlet coating length is defined, wherein the first outlet coating length is 100-x % of the substrate axial length, thereby adjusting the loading of the first outlet coating to a value so that the coating loading ratio, calculated as ratio of the loading of the first inlet coating ($g/inch^3$ ($g/(2.54\ cm)^3$)): loading of the first outlet coating ($g/inch^3$ ($g/(2.54\ cm)^3$)) is less than 0.5, preferably in the range of from 0.10 to 0.45, more preferably from 0.20 to 0.40, more preferably from 0.30 to 0.35.

25. The process of embodiment 24, wherein the first inlet coating contains an oxidation catalyst and the first outlet coating contains an oxidation catalyst.

26. The process of embodiment 24 or 25, further comprising
   (iv) after (iii), applying k further outlet coatings, wherein the $(j+1)^{th}$ outlet coating is applied onto the $j^{th}$ outlet coating so that the $(j+1)^{th}$ outlet coating extends from the outlet end to a $(j+1)^{th}$ outlet coating end, thereby defining a $(j+1)^{th}$ outlet coating length and the $(j+1)^{th}$ outlet coating length is $y_{j+1}$% of the $j^{th}$ outlet coating length with $0<y_{j+1}\leq 100$;
      wherein k is an integer with $k\geq 1$, k preferably being in the range of from 1 to 4, more preferably from 1 to 3; and
      wherein j is an integer with $1\leq j\leq k$.

27. The process of embodiment 26, wherein the $(j+1)^{th}$ outlet coating is applied onto the $j^{th}$ outlet coating so that the $(j+1)^{th}$ outlet coating length is $100\cdot(1-j/(k+1))$% of the first outlet coating length.

28. The process of any of embodiments 24 to 27, wherein in (ii), the first inlet coating is applied so that x is $100/(k+2)$.

29. A system for treating a diesel engine exhaust stream, the system comprising an exhaust conduit in fluid communication with the diesel engine via an exhaust manifold;

the catalyzed soot filter of any of embodiments 1 to 23; and one or more of the following in fluid communication with the catalyzed soot filter: a diesel oxidation catalyst (DOC) article; a selective catalytic reduction (SCR) article; an NOx storage and reduction (NSR) catalytic article.
30. The system of embodiment 29, wherein the catalyzed soot filter is arranged downstream of the DOC article and upstream or downstream of the SCR article.
31. A method of treating a diesel engine exhaust stream, the exhaust stream containing soot particles, said method comprising contacting the exhaust stream with the catalyzed soot filter of any of embodiments 1 to 23, optionally after having directed the exhaust stream through a diesel oxidation catalyst (DOC) article, said DOC article preferably comprising a flow through substrate or a wall-flow substrate.
32. The method of embodiment 31, further comprising directing the exhaust stream resulting from the DOC article or from the catalyzed soot filter through a selective catalytic reduction (SCR) article.

In the following, the present invention is further illustrated by the examples.

EXAMPLES

1. Catalyst Preparation
1.1 Zoned Catalysed Soot Filter with a Washcoat Loading Ratio of Inlet/Outlet Coating of 0.3 (Sample A, Inventive Embodiment)

For the inlet coating, 0.3 g/in$^3$ of gamma-alumina was impregnated with an aqueous solution of Palladium nitrate giving a final dry Pd content of 10 g/ft$^3$ followed by an impregnation of a Platinum solution with Platinum as an amine stabilized Pt complex to give a dry content of Pt 20 g/ft$^3$. The resulting powder was dispersed in water. Subsequently, the resulting slurry was used for coating the cordierite filter substrate (SiC, length: 6 inches=15.24 cm; diameter: 5.66 inches=14.38 cm) from the inlet side to 50% of the total filter length. After drying at 110° C. air and calcination at 450° C. in air the amount of washcoat on the 50% inlet of the filter substrate was approximately 0.32 g/in$^3$.

For the outlet coating 1.0 g/in$^3$ of gamma-alumina was impregnated with an aqueous solution of Palladium nitrate giving a final dry Pd content of 5 g/ft$^3$ followed by an impregnation of a Platinum solution with Platinum as an amine stabilized Pt complex to a dry content of Pt 10 g/ft$^3$. The resulting powder was dispersed in water. Subsequently, the resulting slurry was used for coating the cordierite filter substrate from the filter outlet side to 50% of the total filter length. After drying at 110° C. air and calcination at 450° C. in air the amount of washcoat on the 50% outlet of the filter substrate was approximately 1.01 g/in$^3$.

Thus, the coating loading ratio was approximately 0.32.
1.2 Zoned Catalysed Soot Filter with a Uniform Washcoat Loading Ratio of Inlet/Outlet Coating (Sample B, Comparative Example)

For the inlet coating 0.3 g/in$^3$ of gamma-alumina was impregnated with an aqueous solution of Palladium nitrate giving a final dry Pd content of 10 g/ft$^3$ followed by an impregnation of a Platinum solution with Platinum as an amine stabilized Pt complex to give a dry content of Pt 20 g/ft$^3$. The resulting powder was dispersed in water. Subsequently, the resulting slurry was used for coating the filter substrate (same substrate as in 1.1) from the inlet side to 50% of the total filter length. After drying at 110° C. air and calcination at 450° C. in air the amount of washcoat on the 50% inlet of the filter substrate were approximately 0.32 g/in$^3$.

For the outlet coating 0.3 g/in$^3$ of gamma-alumina was impregnated with an aqueous solution of Palladium nitrate giving a final dry Pd content of 5 g/ft$^3$ followed by an impregnation of a Platinum solution with Platinum as an amine stabilized Pt complex to a dry content of Pt 10 g/ft$^3$. The resulting powder was dispersed in water. Subsequently, the resulting slurry was used for coating the filter substrate from the filter outlet side to 50% of the total filter length. After drying at 110° C. air and calcination at 450° C. in air the amount of washcoat on the 50% outlet of the filter substrate were approximately 0.32 g/in$^3$.

Thus, the coating loading ratio was approximately 1.0.
2. Comparison of State of the Art Catalyst Technologies with Invention Technology (Testing of Maximum Soot Loading by Drop to Idle Regeneration Test)
2.1 Sample A (Inventive)

Zoned catalysed soot filter with a washcoat loading ratio of inlet/outlet coating of 0.32:

Inlet coat: 20 g/ft$^3$ Pt, 10 g/ft$^3$ Pd, 0.3 g/in$^3$ gamma-alumina

Outlet coat: 10 g/ft$^3$ Pt, 5 g/ft$^3$ Pd, 1.0 g/in$^3$ gamma-alumina 2.2 Sample B (Comparative)

Zoned catalysed soot filter with a washcoat loading ratio of inlet/outlet coating of approximately 1 (uniform washcoat loading):

Inlet coat: 20 g/ft$^3$ Pt, 10 g/ft$^3$ Pd, 0.3 g/in$^3$ gamma-alumina

Outlet coat: 10 g/ft$^3$ Pt, 5 g/ft$^3$ Pd, 0.3 g/in$^3$ gamma-alumina

3. Test Procedures (Drop to Idle Testing for SML)

Samples A and B were tested for maximum temperature in drop to idle regeneration testing. The lower the maximum temperature and gradient during drop to idle regeneration, the higher the maximum soot loading of the filter. Prior testing, the samples were loaded with 5.5 g/l (=5.5 g per l substrate) soot in the exhaust stream of a 4 cylinder light duty diesel engine with 2 L engine displacement via low city mode driving.

For drop to idle regeneration testing, each sample was placed downstream in the exhaust line from a 4 cylinder light duty diesel engine with 2 L displacement. The temperature in front of the catalyzed soot filter was raised to 620° C. When the temperature in the first thermocouple (1, cf. FIG. 3, distance from the CSF inlet side: 1 inch=2.54 cm) of the catalyzed soot filter reached 650° C. by soot regeneration, the engine was switched to idle mode. The highest temperatures and temperature gradients occurred in the rear part of the CSF.

Figure 1:
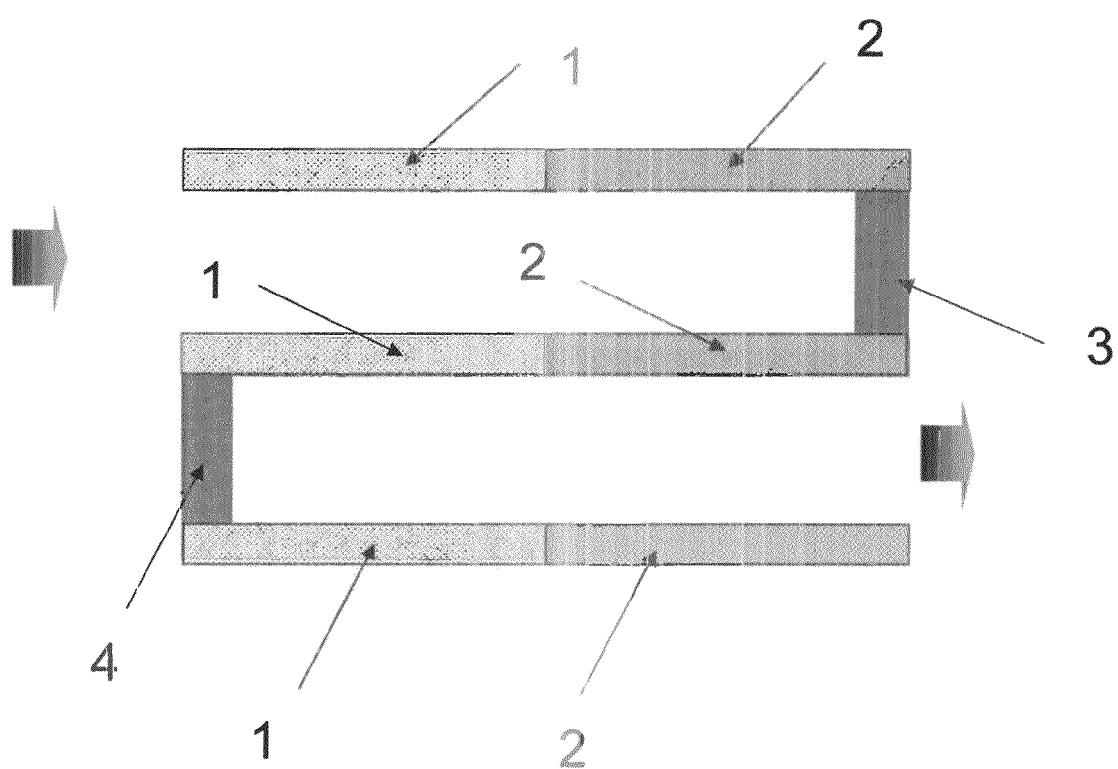
FIG. 1 a sketch of the zoned catalysed soot filter (CSF) with a higher washcoat loading in the outlet zone of the CSF with a 50% over length inlet coating and a 50% over length outlet coating.
Figure 2:
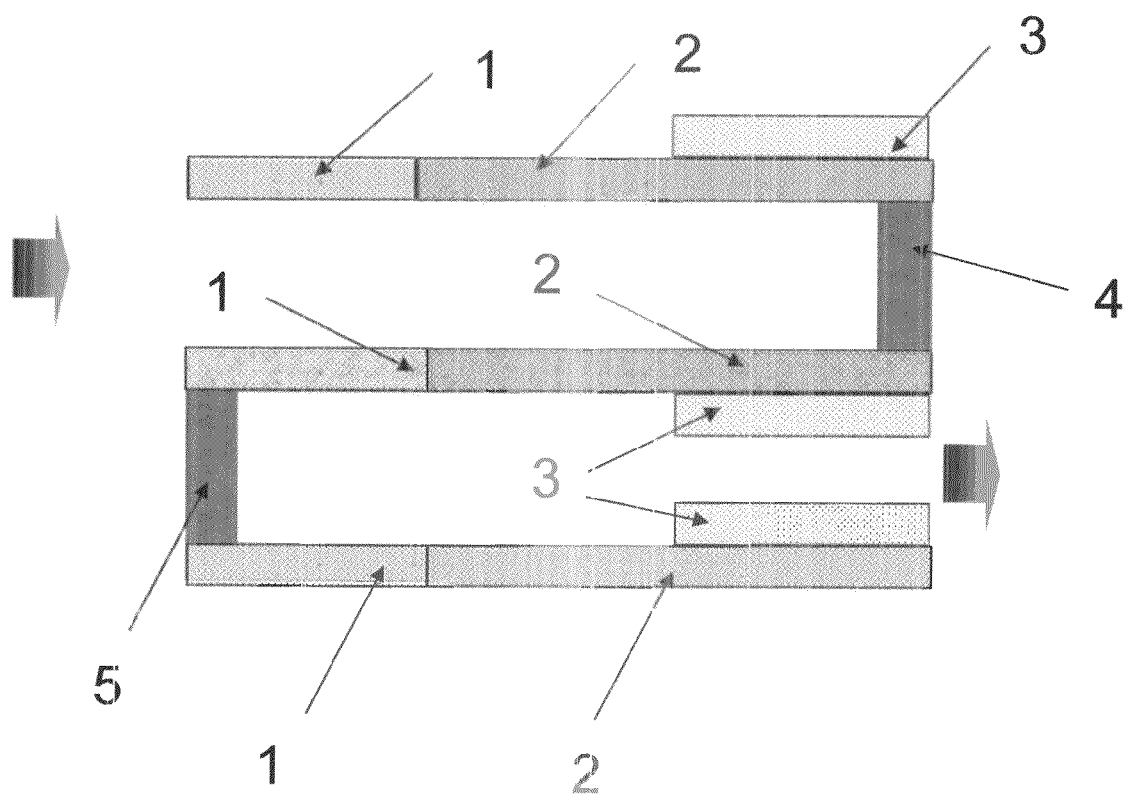
FIG. 2 shows a sketch of the zoned catalysed soot filter with a higher washcoat loading in the outlet zone of the CSF with a washcoat gradient over the axial substrate length.
Figure 3:
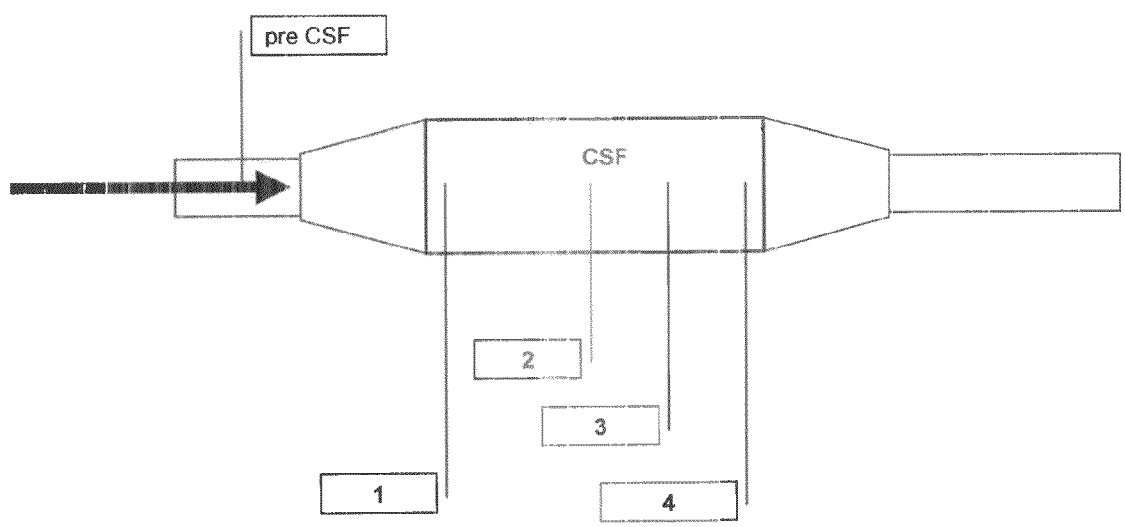
FIG. 3 shows the placement of thermocouples 1 to 4 in samples A and B for the drop to idle regeneration according to the Example. Thermocouple 1 is located 1 inch from the inlet end of the CSF, thermocouple 2 is located 3 inches from the inlet end of the CSF, thermocouple 3 is located 4 inches from the inlet end of the CSF, and thermocouple 4 is located 4 inches from the inlet end of the CSF.

The placement of thermocouples 1 to 4 in samples A and B for the drop to idle regeneration is shown in FIG. 3. The temperature vs. time curves during the drop to idle test for the 4 thermocouples for samples A and B are shown in FIG. 4 and FIG. 5, respectively. Sample A showed significant lower maximum temperatures compared to sample B. Since the lower the temperature, the higher the soot mass limit, the maximum soot mass limit is higher for sample A. The maximum temperatures for the thermocouples in the catalysed soot filter samples A and B are shown Table 1 below. The maximum temperature in the rear position at thermocouple 4" from the catalyzed soot filter inlet is approximately 140° C. lower for the zoned catalysed soot filter with a washcoat loading ratio of inlet/outlet coating of 0.32:

| | Thermocouple position | | | |
|---|---|---|---|---|
| Sample | 1<br>1 inch from<br>CSF inlet | 2<br>3 inches from<br>CSF inlet | 3<br>4 inches from<br>CSF inlet | 4<br>5 inches from<br>CSF inlet |
| Sample A | 650° C. | 665° C. | 693° C. | 722° C. |
| Sample B | 650° C. | 680° C. | 744° C. | 860° C. |

The invention claimed is:

1. A catalyzed soot filter, comprising
a wall flow substrate comprising an inlet end, an outlet end, a substrate axial length extending between the inlet end and the outlet end, and a plurality of passages defined by internal walls of the wall flow substrate;
wherein the plurality of passages comprise inlet passages having an open inlet end and a closed outlet end, and outlet passages having a closed inlet end and an open outlet end;
wherein the internal walls of the inlet passages comprise a first inlet coating that extends from the inlet end to a first inlet coating end, thereby defining a first inlet coating length, wherein the first inlet coating length is x % of the substrate axial length with 0<x<100;
wherein the internal walls of the outlet passages comprise a first outlet coating that extends from the outlet end to a first outlet coating end, thereby defining a first outlet coating length, wherein the first outlet coating length is 100-x % of the substrate axial length;
wherein the first inlet coating length defines an upstream zone and the first outlet coating length defines a downstream zone;
wherein the first inlet coating and the first outlet coating are present on the wall flow substrate at a coating loading ratio in the range from 0.20 to 0.40, calculated as ratio of the loading of the first inlet coating (g/inch$^3$ (g/(2.54 cm)$^3$)): loading of the first outlet coating (g/inch$^3$ (g/(2.54 cm)$^3$)).

2. The catalyzed soot filter of claim 1, wherein the first inlet coating contains an oxidation catalyst and wherein the first outlet coating contains an oxidation catalyst.

3. The catalyzed soot filter of claim 2, wherein the first outlet coating comprises the oxidation catalyst in an amount of from 5 to 100 g/ft$^3$ (g/(30.48 cm)$^3$.

4. The catalyzed soot filter of claim 1, wherein x is in the range of from 25 to 75.

5. The catalyzed soot filter of claim 1, wherein the first inlet coating comprises an oxidation catalyst comprising at least one platinum group metal (PGM).

6. The catalyzed soot filter of claim 5, wherein the PGM ratio, defined as total amount of PGM contained in the first inlet coating (g/ft$^3$ (g/(30.48 cm)$^3$) divided by the total amount of PGM contained in the first outlet coating (g/ft$^3$ (g/(30.48 cm)$^3$) is in the range of from 1:10 to 1:2.

7. The catalyzed soot filter of claim 5, wherein the PGM ratio, defined as total amount of PGM contained in the first inlet coating (g/ft$^3$ (g/(30.48 cm)$^3$) divided by the total amount of PGM contained in the first outlet coating (g/ft$^3$ (g/(30.48 cm)$^3$) is in the range of from 2:1 to 10:1.

8. The catalyzed soot filter of claim 1, wherein the first inlet coating comprises the oxidation catalyst in an amount of from 5 to 100 g/ft$^3$(g/(30.48 cm)$^3$).

9. The catalyzed soot filter of claim 1, wherein the first outlet coating comprises an oxidation catalyst comprising at least one platinum group metal (PGM).

10. The catalyzed soot filter of claim 1, wherein the first inlet coating and the first outlet coating comprise an oxidation catalyst which consists of platinum and palladium, wherein the weight ratio of platinum: palladium in the first inlet coating is in the range of from 10:1 to 1:10, and wherein the weight ratio of platinum : palladium in the first outlet coating is in the range of from 10:1 to 1:10.

11. The catalyzed soot filter of claim 1, wherein the first inlet coating and the first outlet coating comprise at least one porous support material, wherein the at least one porous support material of the first inlet coating is selected from the group consisting of Al$_2$O$_3$, ZrO$_2$, CeO$_2$, SiO$_2$ and a mixture of two or more thereof, and wherein the at least one porous support material of the first outlet coating is selected from the group consisting of Al$_2$O$_3$, ZrO$_2$, CeO$_2$, SiO$_2$ and a mixture of two or more thereof.

12. The catalyzed soot filter of claim 1, additionally comprising k further outlet coatings, wherein the (j+1)$^{th}$ outlet coating is located on top of the j$^{th}$ outlet coating, said (j+1)$^{th}$ outlet coating extending from the outlet end to a (j+1)$^{th}$ outlet coating end, thereby defining a (j+1)$^{th}$ outlet coating length, wherein the (j+1)$^{th}$ outlet coating length is y$_{j+1}$ % of the j$^{th}$ outlet coating length with 0<y$_{j+1}$≤100;
wherein k is an integer with k≥1; and
wherein j is an integer with 1≤j≤k.

13. The catalyzed soot filter of claim 12, wherein the (j+1)$^{th}$ outlet coating length is 100·(1−j/(k+1)) % of the first outlet coating length.

14. The catalyzed soot filter of claim 12, wherein x is 100/(k+2).

15. The catalyzed soot filter of claim 12, wherein at least one of the further k outlet coatings comprises an oxidation catalyst comprising at least one platinum group metal (PGM).

16. The catalyzed soot filter of claim 12, wherein the k+1 outlet coatings in total comprise the oxidation catalyst in an amount of from 5 to 100 g/ft$^3$ (g/(30.48 cm)$^3$.

17. The catalyzed soot filter of claim 12, wherein the PGM ratio, defined as amount of PGM contained in the first inlet coating (g/ft$^3$ (g/(30.48 cm)3)) divided by the total amount of PGM contained in the k+1 outlet coatings (g/ft$^3$ (g/(30.48 cm)$^3$)) is in the range of from 1:10 to 1:2.

18. The catalyzed soot filter of claim 12, wherein the PGM ratio, defined as amount of PGM contained in the first inlet coating (g/ft$^3$ (g/(30.48 cm)$^3$)) divided by the total amount of PGM contained in the k+1 outlet coatings (g/ft$^3$ (g/(30.48 cm)$^3$)) is in the range of from 2:1 to 10:1.

19. The catalyzed soot filter of claim 12, wherein the first inlet coating and the k+1 outlet coatings comprise an oxidation catalyst which consists of platinum and palladium, wherein the weight ratio of platinum: palladium in the first inlet coating is in the range of from 10:1 to 1:10, and wherein the weight ratio of platinum: palladium in the k+1 outlet coating is in the range of from 10:1 to 1:10.

20. The catalyzed soot filter of claim 12, wherein at least one-of the k further outlet coatings comprises at least one porous support material, wherein the at least one porous support material of the at least one of the k further outlet coatings is selected from the group consisting of Al$_2$O$_3$, ZrO$_2$, CeO$_2$, SiO$_2$ and a mixture of two or more thereof.

21. The catalyzed soot filter of claim 1, wherein the wall flow substrate has a porosity in the range of from 38 to 75, determined according to mercury porosity measurement according to DIN 66133.

22. The catalyzed soot filter of claim 1, wherein the loading of the first inlet coating is in the range of from 0.1 to 1 g/inch$^3$(g/(2.54 cm)$^3$).

23. A process for manufacturing a catalyzed soot filter of claim 1, comprising
   (i) providing a wall flow substrate, said wall flow substrate comprising an inlet end, an outlet end, a substrate axial length extending between the inlet end and the outlet end, and a plurality of passages defined by internal walls of the wall flow substrate;
   wherein the plurality of passages comprise inlet passages having an open inlet end and a closed outlet end, and outlet passages having a closed inlet end and an open outlet end;
   (ii) applying the first inlet coating to the internal walls of the inlet passages such that the first inlet coating extends from the inlet end to the first inlet coating end whereby a first inlet coating length is defined, wherein the first inlet coating length is x % of the substrate axial length with a<x<100, thereby adjusting the loading of the first inlet coating to a predetermined value;
   (iii) before (ii) or simultaneously with (ii) or after (ii), applying the first outlet coating to the internal walls of the outlet passages such that the first outlet coating extends from the outlet end to the first outlet coating end whereby a first outlet coating length is defined, wherein the first outlet coating length is 100-x % of the substrate axial length, thereby adjusting the loading of the first outlet coating to a value so that the coating loading ratio, calculated as ratio of the loading of the first inlet coating (g/inch$^3$ (g/(2.54 cm)$^3$)): loading of the first outlet coating (g/inch$^3$ (g/(2.54 cm)$^3$)) is in the range of from 0.20 to 0.40.

24. The process of claim 23, wherein the first inlet coating contains an oxidation catalyst and the first outlet coating contains an oxidation catalyst.

25. The process of claim 23, further comprising
   (iv) after (iii), applying k further outlet coatings, wherein the (j+1)$^{th}$ outlet coating is applied onto the j$^{th}$ outlet coating so that the (j+1)$^{th}$ outlet coating extends from the outlet end to a (j+1)$^{th}$ outlet coating end, thereby defining a (j+1)$^{th}$ outlet coating length and the (j+1)$^{th}$ outlet coating length is $y_{j+1}$ % of the j$^{th}$ outlet coating length with $0<y_{j+1}<100$;
   wherein k is an integer with k>1; and
   wherein j is an integer with 1≤j≤k.

26. The process of claim 25, wherein the (j+1)$^{th}$ outlet coating is applied onto the j$^{th}$ outlet coating so that the (j+1)$^{th}$ outlet coating length is 100·(1−j/(k+1)) % of the first outlet coating length.

27. The process of claim 23, wherein in (ii), the first inlet coating is applied so that x is 100/(k+2).

28. A system for treating a diesel engine exhaust stream, the system comprising
   an exhaust conduit in fluid communication with the diesel engine via an exhaust manifold;
   the catalyzed soot filter of claim 1; and
   one or more of the following in fluid communication with the catalyzed soot filter: a diesel oxidation catalyst (DOC) article; a selective catalytic reduction (SCR) article; an NOx storage and reduction (NSR) catalytic article.

29. The system of claim 28, wherein the catalyzed soot filter is arranged downstream of the DOC article and upstream or downstream of the SCR article.

30. A method of treating a diesel engine exhaust stream, the exhaust stream containing soot particles, said method comprising contacting the exhaust stream with the catalyzed soot filter of claim 1, optionally after having directed the exhaust stream through a diesel oxidation catalyst (DOC) article.

31. The method of claim 30, further comprising directing the exhaust stream resulting from the DOC article or from the catalyzed soot filter through a selective catalytic reduction (SCR) article.

32. The catalyzed soot filter of claim 1, wherein the coating loading ratio is in the range of from 0.30 to 0.35.

* * * * *

UNITED STATES PATENT AND TRADEMARK OFFICE
CERTIFICATE OF CORRECTION

PATENT NO. : 8,802,016 B2  
APPLICATION NO. : 12/951868  
DATED : August 12, 2014  
INVENTOR(S) : Gerd Grubert Page 1 of 1

It is certified that error appears in the above-identified patent and that said Letters Patent is hereby corrected as shown below:

Title page, item (73) Assignee: "BASF Catalyst Germany GmbH, Nienburg/Weser (DE)" should be changed to --BASF Catalysts Germany GmbH, Nienburg/Weser (DE)--.

Signed and Sealed this  
Twenty-first Day of October, 2014

Michelle K. Lee  
*Deputy Director of the United States Patent and Trademark Office*